(12) United States Patent
Toda et al.

(10) Patent No.: US 11,440,646 B2
(45) Date of Patent: Sep. 13, 2022

(54) REMAINING TIRE TREAD DEPTH MANAGEMENT SYSTEM

(71) Applicant: BRIDGESTONE CORPORATION, Tokyo (JP)

(72) Inventors: Hayato Toda, Tokyo (JP); Seigo Hata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 293 days.

(21) Appl. No.: 16/772,484

(22) PCT Filed: Nov. 6, 2018

(86) PCT No.: PCT/JP2018/041103
§ 371 (c)(1),
(2) Date: Jun. 12, 2020

(87) PCT Pub. No.: WO2019/116782
PCT Pub. Date: Jun. 20, 2019

(65) Prior Publication Data
US 2020/0398975 A1   Dec. 24, 2020

(30) Foreign Application Priority Data

Dec. 14, 2017   (JP) .............................. JP2017-239702

(51) Int. Cl.
*B64C 25/36* (2006.01)
*B64F 5/60* (2017.01)
(Continued)

(52) U.S. Cl.
CPC .............. *B64C 25/36* (2013.01); *B60C 19/00* (2013.01); *B64F 5/60* (2017.01); *G01B 11/02* (2013.01);
(Continued)

(58) Field of Classification Search
None
See application file for complete search history.

(56) References Cited

U.S. PATENT DOCUMENTS 5,245,867 A      9/1993  Sube et al.
10,773,557 B1 *  9/2020  Mast ...................... G01B 11/22
(Continued)

FOREIGN PATENT DOCUMENTS

CN       2654510 Y     11/2004
CN     103674573 A      3/2014
(Continued)

OTHER PUBLICATIONS

International Search Report for PCT/JP2018/041103 dated Jan. 15, 2019 [PCT/ISA/210].
(Continued)

*Primary Examiner* — Peter J Macchiarolo
*Assistant Examiner* — Jermaine L Jenkins
(74) *Attorney, Agent, or Firm* — Sughrue Mion, PLLC

(57) ABSTRACT

A remaining tire tread depth management system includes a remaining tire tread depth measurement device configured to measure a remaining tread depth of at least one of aircraft tires mounted on an aircraft, a tire wear amount estimation device configured to estimate a wear amount of all of the aircraft tires mounted on the aircraft including the aircraft tires, and a tire management server configured to estimate a remaining tread depth and a number of available flight times of all of the aircraft tires in accordance with measurement data output from the remaining tire tread depth measurement device and estimation data output from the tire wear amount estimation device.

10 Claims, 14 Drawing Sheets

(51) Int. Cl.
*B60C 19/00* (2006.01)
*G01B 11/02* (2006.01)
*G01M 17/02* (2006.01)

(52) U.S. Cl.
CPC ....... *G01M 17/02* (2013.01); *B60C 2019/004* (2013.01); *B60C 2200/02* (2013.01)

(56) References Cited

U.S. PATENT DOCUMENTS

| | | |
|---|---|---|
| 2003/0159493 A1 | 8/2003 | Grout |
| 2009/0000370 A1 | 1/2009 | Lionetti et al. |
| 2012/0053784 A1 | 3/2012 | Schmidt et al. |
| 2014/0067193 A1 | 3/2014 | Gokyu et al. |
| 2015/0375584 A1 | 12/2015 | Makino et al. |
| 2019/0009618 A1 | 1/2019 | McPillan et al. |
| 2019/0084355 A1 | 3/2019 | McPillan et al. |

FOREIGN PATENT DOCUMENTS

| | | | |
|---|---|---|---|
| CN | 105224711 A | 1/2016 | |
| CN | 106918299 A | 7/2017 | |
| DE | 102009006705 A1 * | 8/2010 | ............ G01M 17/02 |
| EP | 2009389 A1 | 12/2008 | |
| JP | 05-256738 A | 10/1993 | |
| JP | 9-329530 A | 12/1997 | |
| JP | 2002-131191 A | 5/2002 | |
| JP | 2013-113724 A | 6/2013 | |
| JP | 2017-156295 A | 9/2017 | |
| WO | 2017/156213 A1 | 9/2017 | |
| WO | 2017/156216 A1 | 9/2017 | |

OTHER PUBLICATIONS

Extended European Search Report dated Jul. 1, 2021 in Application No. 18887931.6.
Search Report dated Jul. 8, 2021 in Chinese Application No. 2018800803961.
Baptiste Lebreton et al., "A quantitative approach to assessing the profitability of car and truck tire remanufacturing", Int. J. Production Economics, 2006, vol. 104, pp. 639-652 (14 pages total).
Duan Xiang et al., "Simulation Analysis of Tire Wear's Key Factor on the Mechanical Characteristics of the Tire", Science Technology and Engineering, Jan. 2014, vol. 14, No. 3, pp. 112-115 (4 pages total).

* cited by examiner

REMAINING TIRE TREAD DEPTH MANAGEMENT SYSTEM

CROSS REFERENCE TO RELATED APPLICATIONS

This application is a National Stage of International Application No. PCT/JP2018/041103 filed Nov. 6, 2018, claiming priority based on Japanese Patent Application No. 2017-239702 filed Dec. 14, 2017.

TECHNICAL FIELD

The present invention relates to a remaining tire tread depth management system.

BACKGROUND ART

Aircraft undergo an overhaul of bodies including aircraft tires after landing at airports. Wheel chocks are typically placed around part of aircraft tires of an aircraft when overhauled. The overhauling process includes a step of visually checking a tread depth remaining on each of the aircraft tires (a remaining tread depth) by a mechanic, who then follows a regular step of measuring the remaining tread depth with a gauge, for example, when determining that the remaining tread depth is insufficient. To decrease the number of the steps necessary for the measurement, a method is known that estimates a wear amount of each aircraft tire (refer to Patent Literature 1).

The method disclosed in Patent Literature 1 acquires plural kinds of wear energy corresponding to plural running states (such as a touching down state, a deceleration state after touching down, and a taxiing state) classified depending on the conditions of use, and estimates the wear amount of the respective aircraft tires based on the acquired wear energy.

CITATION LIST

Patent Literature

Patent Document 1: Japanese Unexamined Patent Application Publication No. 2013-113724

SUMMARY OF INVENTION

The method disclosed in Patent Literature 1 estimates the wear amount of the respective aircraft tires according to the measurement data obtained by a predetermined measurement device, but does not presume the situation in which the aircraft tires are actually used. In the situation in which the aircraft tires are actually used, the wear amount of the aircraft tires typically greatly varies depending on the state of the ground surface in each airport, a distance necessary for taxiing, a frequency of circling, a total weight of an aircraft body, and the position of the center of gravity of the aircraft body which changes due to seating positions of passengers or baggage, for example. The method disclosed in Patent Literature 1 thus cannot accurately estimate the wear amount of the respective aircraft tires in the situation in which the aircraft tires are actually used. In other words, an accurate estimation of the wear amount of the aircraft tires can provide an airline with the information on how many flights the aircraft still can make while using the current aircraft tires, for example.

To solve the conventional problems described above, the present invention provides a remaining tire tread depth management system capable of estimating a remaining tread depth of each aircraft tire mounted on an aircraft with a high accuracy, and notifying a notification target of the remaining tread depth and the number of available flight times that the respective aircraft tires still can withstand.

Technical Solution

A remaining tire tread depth management system according to the present invention includes a remaining tire tread depth measurement device configured to measure a remaining tread depth of at least one of first aircraft tires mounted on an aircraft, a tire wear amount estimation device configured to estimate a wear amount of all aircraft tires mounted on the aircraft including the first aircraft tires, and a tire management server configured to estimate a remaining tread depth of all of the aircraft tires in accordance with measurement data output from the remaining tire tread depth measurement device and estimation data output from the tire wear amount estimation device. The tire management server includes an acquisition unit configured to acquire the remaining tread depth of the corresponding first aircraft tire measured by the remaining tire tread depth measurement device, and the wear amount of the corresponding first aircraft tire estimated by the tire wear amount estimation device, an error calculation unit configured to calculate an error of the wear amount of the first aircraft tire based on the remaining tread depth of the first aircraft tire and the wear amount of the first aircraft tire acquired by the acquisition unit, a first error correction unit configured to correct the error of the wear amount of the first aircraft tire calculated by the error calculation unit, a second error correction unit configured to correct the wear amount of the aircraft tires other than the first aircraft tire in accordance with a correction coefficient regarding the error corrected by the first error correction unit, a remaining tread depth estimation unit configured to estimate a remaining tread depth of all of the aircraft tires in accordance with the wear amount of all of the aircraft tires corrected by the first error correction unit and the second error correction unit, a number-of-times estimation unit configured to estimate a number of available flight times of all of the aircraft tires mounted on the aircraft in accordance with the wear amount of all of the aircraft tires corrected by the first error correction unit and the second error correction unit and a flight schedule, and a notification unit configured to notify a predetermined notification target of the remaining tread depth estimated by the remaining tread depth estimation unit and the number of available flight times estimated by the number-of-times estimation unit.

Advantageous Effects

The present invention can estimate a remaining tread depth of each aircraft tire mounted on an aircraft with a high accuracy, and notify a notification target of the remaining tread depth and the number of available flight times that the respective aircraft tires still can withstand.

DESCRIPTION OF EMBODIMENTS

Figure 1:
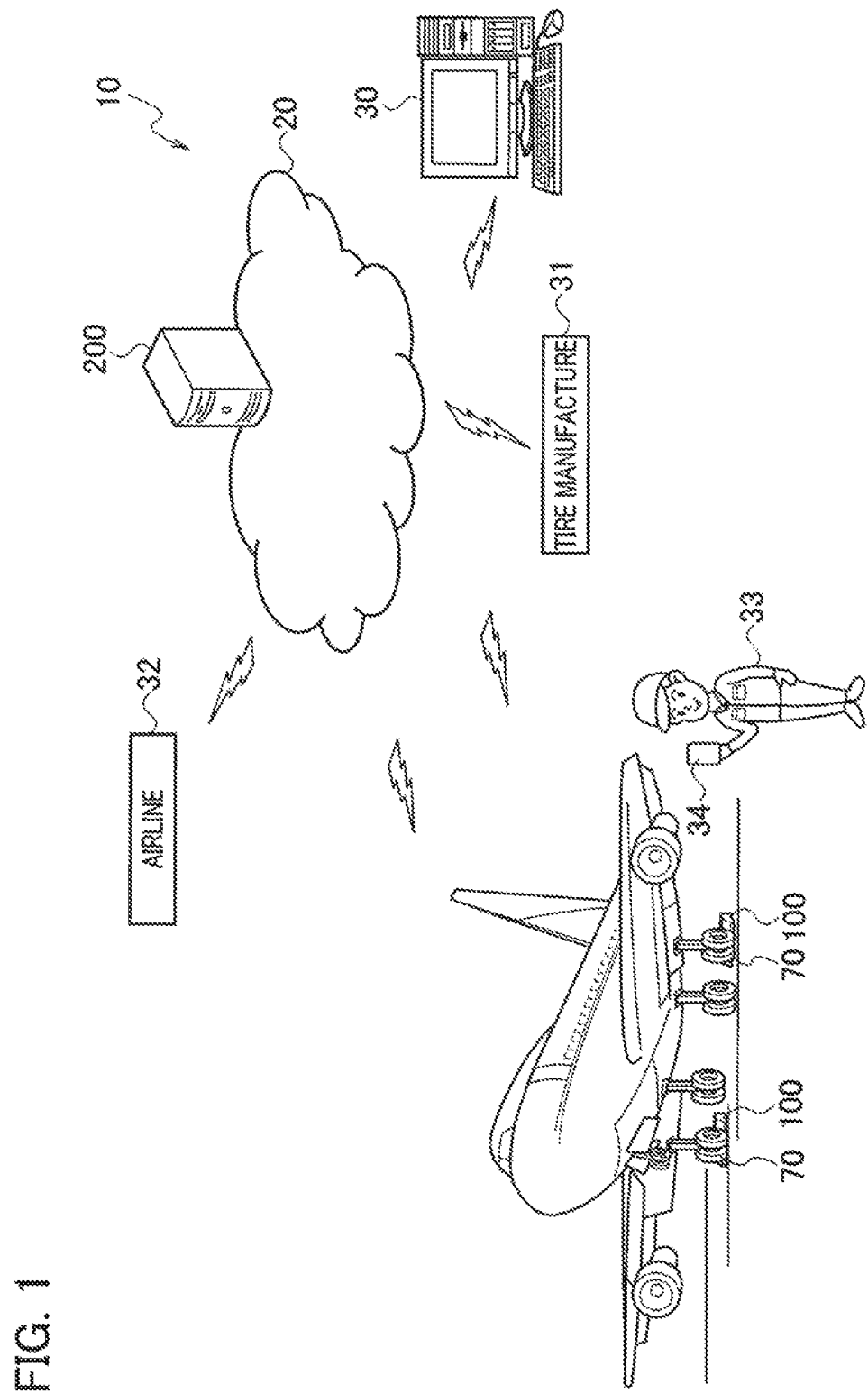
FIG. 1 is a schematic view of an entire remaining tire tread depth management system according to the present embodiment of the present invention.

Hereinafter, an embodiment according to the present invention will be described with reference to the drawings. The same elements illustrated in the drawings are indicated by the same reference numerals, and overlapping explanations are not made below.

(1) Configuration Example of Remaining Tire Tread Depth Management System

An example of a configuration of a remaining tire tread depth management system 10 is described below with reference to FIG. 1. As illustrated in FIG. 1, the remaining tire tread depth management system 10 includes a remaining tire tread depth measurement device 100, a tire wear amount estimation device 30, a tire management server 200, a tire manufacturer 31, and an airline 32.

The remaining tire tread depth measurement device 100 is placed in a location in which an aircraft is overhauled. The remaining tire tread depth measurement device 100 also serves as a wheel chock for an aircraft tire 70. As illustrated in FIG. 1, the remaining tire tread depth measurement device 100 is used as a wheel chock for part of the entire aircraft tires 70 mounted on the aircraft. The arrangement position of the remaining tire tread depth measurement device 100 illustrated in FIG. 1 is an example.

The remaining tire tread depth measurement device 100, which serves as a wheel chock, locks the aircraft tire 70. At least one remaining tire tread depth measurement device 100 is only required to be placed, and typical wheel chocks can be used for the other aircraft tires.

The remaining tire tread depth measurement device 100 measures a tread depth (a remaining tread depth) which is a groove 72 (refer to FIG. 7) formed in a tread 71 (not illustrated in FIG. 1; refer to FIG. 7) of the aircraft tire 70. As described below, the groove 72 is a circumferential groove provided in the tire circumferential direction.

The remaining tire tread depth measurement device 100 has a wireless communication function so as to communicate with the tire communication server 200 via a communication network 20. The remaining tire tread depth measurement device 100 outputs the measured remaining tread depth of the aircraft tire 70 to the tire management server 200.

The tire wear amount estimation device 30 is a general-purpose computer including a processor including a CPU and a memory such as a read-only memory (ROM) and a random-access memory (RAM), for example. The CPU reads out a program stored in the ROM to the RAM and executes the program. The tire wear amount estimation device 30 may be either a built-in terminal device or a mobile terminal device easy to carry (such as a smartphone).

The tire wear amount estimation device 30 mutually communicates with the airline 32 via the communication network 20. The tire wear amount estimation device 30 acquires pieces of information from the airline 32 via the communication network 20 to estimate a wear amount of all of the aircraft tires mounted on the aircraft. The information that the tire wear amount estimation device 30 acquires from the airline 32 will be described below. As used herein, the aircraft may be simply referred to as a "body".

The tire wear amount estimation device 30 outputs the wear amount of all of the aircraft tires estimated to the tire management server 200.

The tire management server 200 estimates the remaining tread depth of all of the aircraft tires in accordance with the measurement data output from the remaining tire tread depth measurement device 100 and the estimation data output from the tire wear amount estimation device 30.

The tire management server 200 notifies a predetermined notification target of the remaining tread depth of all of the aircraft tires estimated. In particular, the tire management server 200 can notify the tire manufacture 31 and a mobile terminal 34 carried by a user 33 of the remaining tread depth of all of the aircraft tires estimated. The user 33 is herein a mechanic who overhauls the aircraft. The mobile terminal 34 used can be a smartphone or a tablet terminal in which application programs can be installed freely.

The communication network 20 can communicate with other devices in a wireless or wired manner or in both wireless and wired manners, and may include the Internet. According to the present embodiment, the remaining tire tread depth measurement device 30, the tire manufacturer 31, the airline 32, and the mobile terminal 34 are connected to the communication network 20 in a wireless communication manner.

(2) Configuration Example of Remaining Tire Tread Depth Measurement Device

An example of a configuration of the remaining tire tread depth measurement device 100 is described below with reference to FIG. 2 and FIG. 3.

Figure 2:
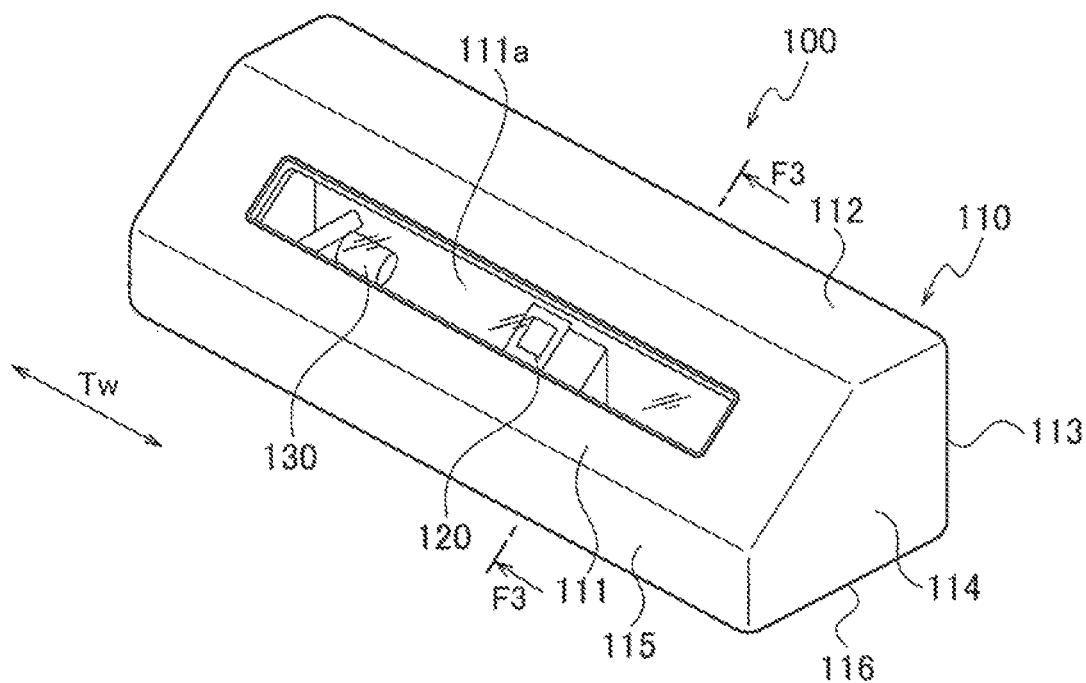
FIG. 2 is a schematic perspective view of an entire remaining tire tread depth measurement device according to the present embodiment of the present invention.
Figure 3:
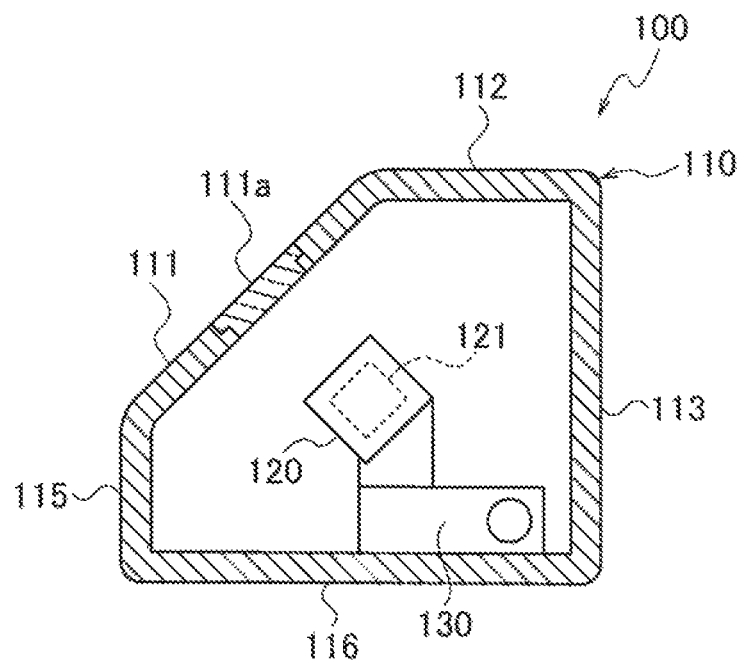
FIG. 3 is a cross-sectional view of the remaining tire tread depth measurement device taken along line F3-F3 in FIG. 2.

As illustrated in FIG. 2 and FIG. 3, the remaining tire tread depth measurement device 100 includes a housing part 110, a laser displacement sensor 120, and an electric slider 130.

The housing part 110 has a shape similar to a typical wheel chock. The housing part 110 houses the laser displacement sensor 120 and the electric slider 130.

The housing part 110 has a box-like shape having an inclined surface 111, a top surface 112, a back surface 113, side surfaces 114, a vertical surface 115, and a bottom surface 116. The housing part 110 may be formed from synthetic resin (such as MC nylon (registered trademark)) or an aluminum light alloy.

The inclined surface 111 is a planar surface inclined to the vertical direction (the upright direction). The inclined surface 111 is to face the tread 71 of the aircraft tire 70 mounted on the aircraft. The inclined surface 11, which can be brought into contact with the tread 71, basically locks the aircraft tire 70 so as to prevent the aircraft tire 70 from climbing over the top surface 112.

The top surface 112 extends in the horizontal direction to be connected to the upper edge of the inclined surface 111 and the upper edge of the back surface 113.

The back surface 113 is a planar surface opposed to the inclined surface 111 and the vertical surface 115. The back surface 113 is the planar surface behind the inclined surface 111 which is to face the tread 71.

The paired side surfaces 114 are arranged in the direction perpendicular to the inclined surface 111, the top surface 112, the back surface 113, and the vertical surface 115. Since the inclined surface 111 is provided to face the tread 71, the inclined surface 111, the top surface 112, the back surface 113, and the vertical surface 115 are arranged along the tire width direction Tw (the tread width direction). The side surfaces 114 are arranged along the direction perpendicular to the tire width direction Tw.

The vertical surface 115 extends in the vertical direction to be connected to the lower edge of the inclined surface 111. The vertical surface 115 preferably has a predetermined height (for example, 40 mm or greater) so as to ensure a strength of the housing part 110 and prevent the aircraft tire 70 from climbing over the top surface 112. The vertical surface 115 is not necessarily provided.

The bottom surface 116 is opposed to the top surface 112, and is brought in contact with the ground surface. The bottom surface 116 is not necessarily provided either. Namely, the part corresponding to the bottom surface 116 may be an open part.

The size of the housing part 110 is greater for the tire width direction Tw (a predetermined direction) than for the direction perpendicular to the tire width direction Tw. In particular, the length of each of the inclined surface 111, the top surface 112, the back surface 113, and the vertical surface 115 in the tire width direction Tw is greater than the length of the paired side surfaces 114 in the extending direction.

The inclined surface 111 extending in the tire width direction Tw (the predetermined direction) is provided with a measurement window 111a. The measurement window 111a also extends in the tire width direction Tw.

The measurement window 111a is an open part formed on the inclined surface 111. The measurement window 111a according to the present embodiment is fitted with a transparent glass. A measurement unit 121 of the laser displacement sensor 120 is arranged inside the measurement window 111a.

The laser displacement sensor 120 measures a depth of the groove 72 (refer to FIG. 7) provided in the tread 71 of the aircraft tire 70.

In particular, the laser displacement sensor 120 includes the measurement unit 121 for measuring the depth of the groove 72, which is the remaining tread depth, with no contact with the tread 71. The laser displacement sensor 120 according to the present embodiment serves as a measurement mechanism.

The electric slider 130 causes the laser displacement sensor 120 to slide in the tire with direction Tw (the predetermined direction).

In particular, the electric slider 130 includes a drive unit including a motor, and a guide rail arranged in the predetermined direction. The laser displacement sensor 120 is driven by the electric slider 130 to move along the guide rail. The electric slider 130 according to the present embodiment serves as a slide mechanism.

Figure 4:
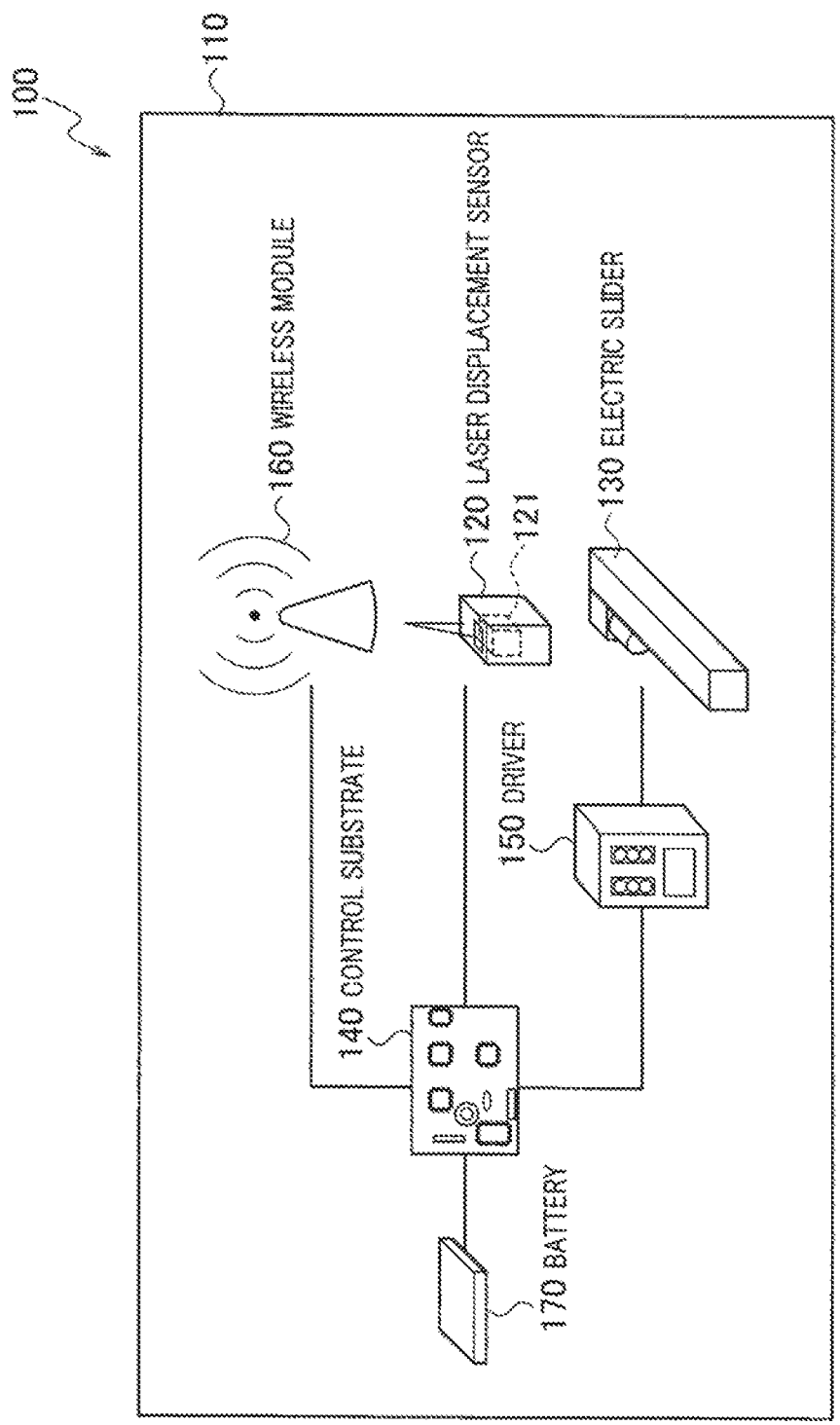
FIG. 4 is a hardware configuration diagram of the remaining tire tread depth measurement device according to the present embodiment of the present invention.

(3) Hardware Configuration Example of Remaining Tire Tread Depth Measurement Device An example of a hardware configuration of the remaining tire tread depth measurement device 100 is described below with reference to FIG. 4. As illustrated in FIG. 4, the housing part 110 houses the laser displacement sensor 120, the electric slider 130, a control substrate 140, a driver 150, a wireless module 160, and a battery 170.

The laser displacement sensor 120 is connected to the control substrate 140. The laser displacement sensor 120 includes the measurement unit 121 which outputs a laser beam 122 (not illustrated in FIG. 4; refer to FIG. 7). The measurement unit 121 outputs the laser beam 122 in accordance with the control by the control substrate 140, and receives the laser beam 122 reflected by the tread 71, so as to measure a distance to the surface of the tread 71.

The measurement unit 121 used may be a red semiconductor laser (class II).

The electric slider 130 is connected to the control substrate 140 via the driver 150. The driver 150 drives the electric slider 130 in accordance with the control by the control substrate 140.

The wireless module 160 executes a wireless communication based on a wireless communication standard supported by the communication network 20. The wireless communication standard which the wireless module 160 follows is typically, but not necessarily, a wireless LAN and Bluetooth (registered trademark).

The battery 170 supplies electric power necessary for the operation of the control substrate 140, and for the operations of the laser displacement sensor 120, the electric slider 130, the driver 150, and the wireless module 160 via the control substrate 140. The type of the battery 170 is typically, but not necessarily, a lithium ion battery (such as DC 24 V).

Figure 5:
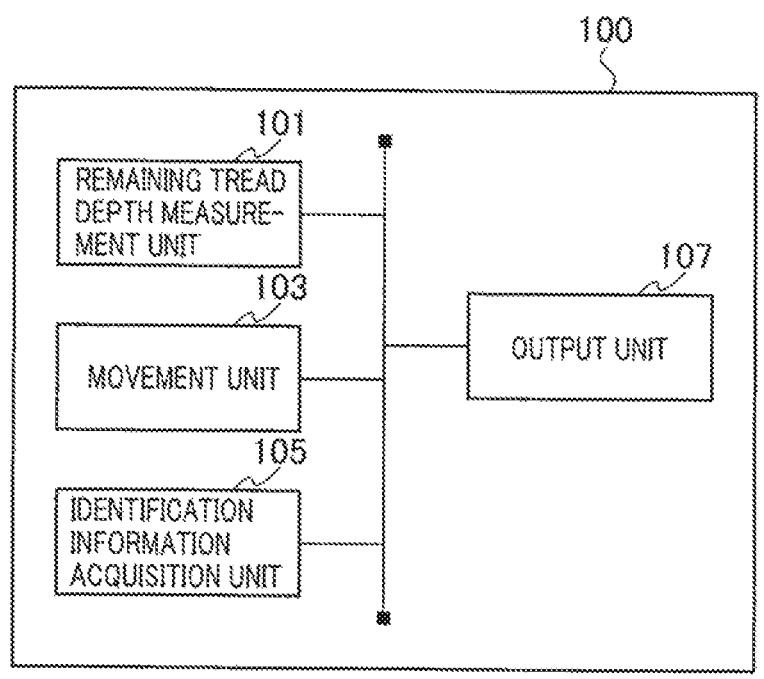
FIG. 5 is a functional block diagram of the remaining tire tread depth measurement device according to the present embodiment of the present invention.

(4) Functional Block Configuration Example of Remaining Tire Tread Depth Measurement Device An example of a functional block configuration of the remaining tire tread depth measurement device 100 is described below with reference to FIG. 5. As illustrated in FIG. 5, the remaining tire tread depth measurement device 100 includes a remaining tread depth measurement unit 101, a movement unit 103, an identification information acquisition unit 105, and an output unit 107.

The remaining tread depth measurement unit 101 measures a tire profile provided on the tread 71, which is the remaining depth of the groove 72 (the remaining tread depth). In particular, the remaining tread depth measurement unit 101 uses the measurement unit 121 that outputs the laser beam 122 (refer to FIG. 4) to measure the depth of the groove 72. The measurement accuracy of the remaining tread depth measurement unit 101 is preferably 0.5 mm or less.

The remaining tread depth measurement unit 101 is implemented by the measurement unit 121 and the control substrate 140 (refer to FIG. 4).

The remaining tread depth measurement unit 101 can measure the remaining tread depth according to a measurement instruction from the tire management server 200. Alternatively, the remaining tread depth measurement unit 101 may regularly output the laser beam 122 to detect a state in which the aircraft has stopped at a predetermined position so as to measure the remaining tread depth.

The movement unit 103 moves the remaining tread depth measurement unit 101, in particular, the measurement unit 121 in the tire width direction Tw. The movement unit 103 is implemented by the electric slider 130, the control substrate 140, and the driver 150 (refer to FIG. 4).

The movement unit 103, when recognizing the type (such as a brand and a size (particularly a tread width)) of the aircraft tire 70 as a measurement target based on the identification information acquired by the identification information acquisition unit 105, may change a moving distance, a moving speed, and a moving pattern of the measurement unit 121, for example, in accordance with the recognized type.

The identification information acquisition unit 105 acquires the identification information about identifying the aircraft tires 70. The identification information acquisition unit 105 is implemented by the control substrate 140 and the wireless module 160.

In particular, the identification information acquisition unit 105 acquires the identification information on the aircraft tires 70. The identification information refers to information for identifying the aircraft tires 70, and is allotted to the respective aircraft tires 70. The identification information is, for example, a serial number carved in the respective aircraft tires 70, but is not limited to this case. The identification information may be any of a two-dimensional indented pattern molded in the respective aircraft tires 70, a bar code attached to the respective aircraft tires 70, or information indicating a brand and a size of the respective aircraft tires 70.

The identification information acquisition unit 105 may also access the tire management server 200 so as to acquire the information on the tread width or the tread pattern associated with the acquired serial number or the brand and the size of the corresponding aircraft tire 70.

The output unit 107 outputs the measurement data of the depth of the groove 72 measured by the remaining tread depth measurement unit 101, in particular, the laser displacement sensor 120. The output unit 107 is implemented by the control substrate 140 and the wireless module 160.

When the identification information of the aircraft tire 70 is acquired by the identification information acquisition unit 105, the output unit 107 can also output the measurement data associated with the corresponding identification information.

When the depth of the groove 72 included in the measurement data is a predetermined value or smaller, the output unit 107 may output an alert. For example, the output unit 107 may cause a light-emitting diode to light up or blink on and off, or may display warning sentences (for example, "The remaining tread depth is decreased: Need to undergo an inspection") on a small display.

(5) Example of Operation of Remaining Tire Tread Depth Measurement Device

Figure 6:
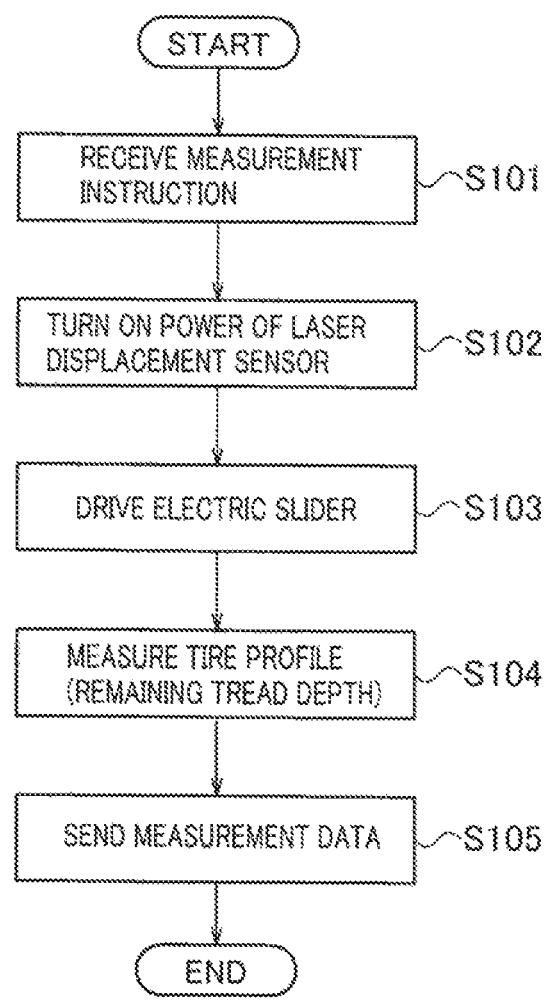
FIG. 6 is a flowchart for illustrating an operation of the remaining tire tread depth measurement device according to the present embodiment of the present invention.

An example of operation of the remaining tire tread depth measurement device 100 is described below with reference to FIG. 6.

In step S101, the remaining tire tread depth measurement device 100 receives the measurement instruction from the tire management server 200. The remaining tire tread depth measurement device 100 may detect that the aircraft has stopped at a predetermined position so as to measure the remaining tread depth, as described above.

The process proceeds to step S102, and the remaining tire tread depth measurement device 100 turns on the power of the laser displacement sensor 120 to output the laser beam 122.

Figure 7:
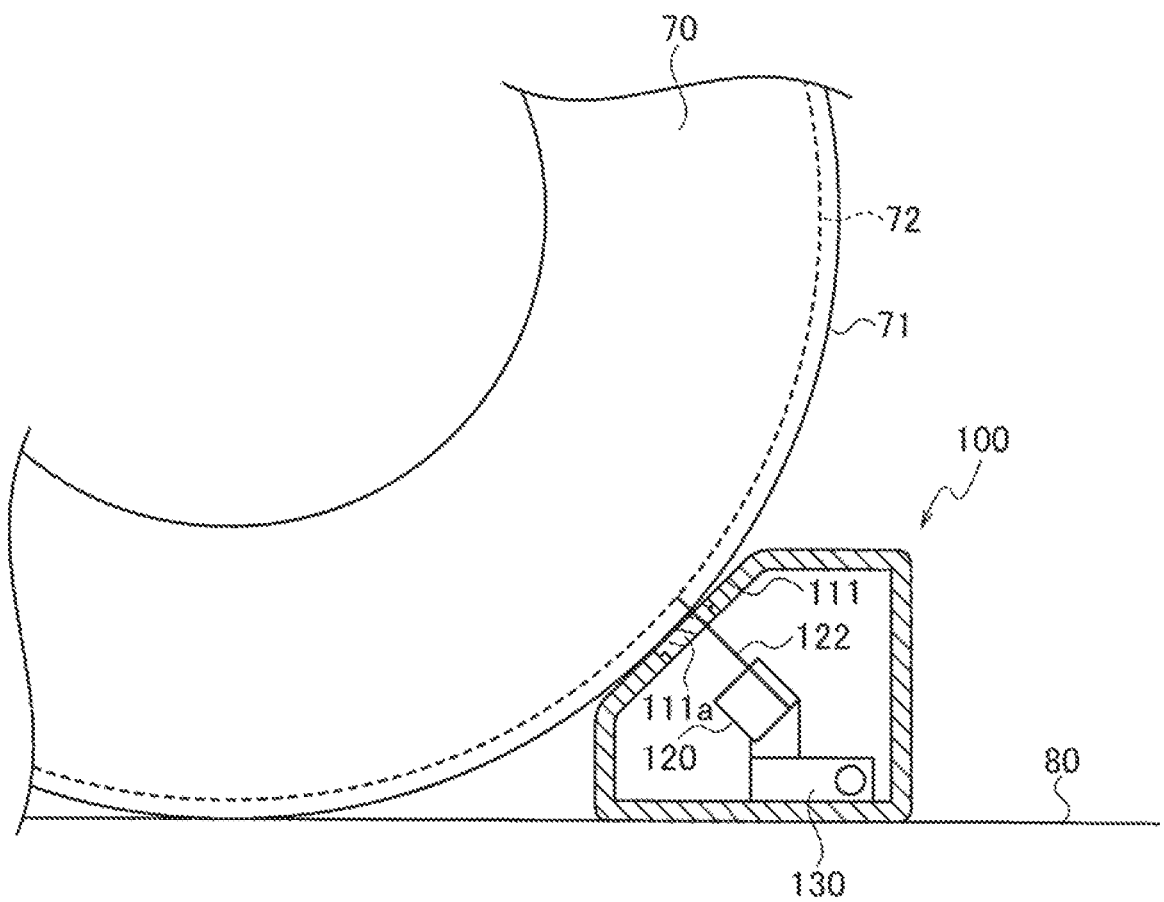
FIG. 7 is a diagram schematically showing a state in which an aircraft tire is locked by the remaining tire tread depth measurement device serving as a wheel chock.

The process proceeds to step S103, and the remaining tire tread depth measurement device 100 drives the electric slider 130 with the laser beam 122 being output. As illustrated in FIG. 7, the surface of the tread 71 of the aircraft tire 70 is brought into contact with the inclined surface 111 of the remaining tire tread depth measurement device 100. The surface of the tread 71 is not necessarily brought into contact with the inclined surface 111.

The laser beam 122 output from the laser displacement sensor 120 reaches the surface of the tread 71 through the measurement window 111a, and is reflected by the surface of the tread 71.

In the state as described above, the electric slider 130 operates to move the laser displacement sensor 120 in the tire width direction Tw (refer to FIG. 2). The remaining tire tread depth measurement device 100 thus measures the projecting state on the surface of the tread 71 (the tire profile) and the depth of the groove 71 (the remaining tread depth) (step S104).

The process proceeds to step S105, and the remaining tire tread depth measurement device 100 sends the tire profile including the measured depth of the groove 72 as the measurement data to the tire management server 200.

Figure 8:
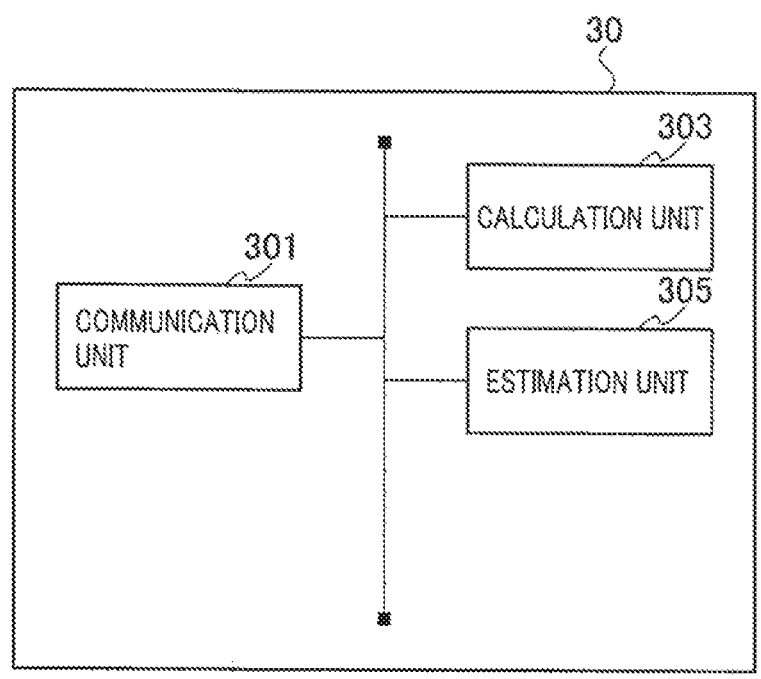
FIG. 8 is a functional block diagram of a tire wear amount estimation device according to the present embodiment of the present invention.

(6) Functional Block Configuration Example of Tire Wear Amount Estimation Device An example of a functional block configuration of the tire wear amount estimation device 30 is described below with reference to FIG. 8. As illustrated in FIG. 8, the tire wear amount estimation device 30 includes a communication unit 301, a calculation unit 303, and an estimation unit 305. The communication unit 301 is an interface connected to the communication network 20 to transfer/receive pieces of data to communicate with the airline 32 and the tire management server 200. The calculation unit 303 calculates wear energy. The estimation unit 305 estimates the wear amount of the aircraft tires. The communication unit 301, the calculation unit 303, and the estimation unit 305 can be fabricated in single or plural processing circuits. The respective processing circuits include a programmed processing device, such as a processing device including an electric circuit. The respective processing circuits include an application-specific integrated circuit (ASIC) configured to execute the functions described above or a device including circuit components.

(7) Example of Operation of Tire Wear Amount Estimation Device

Figure 9:
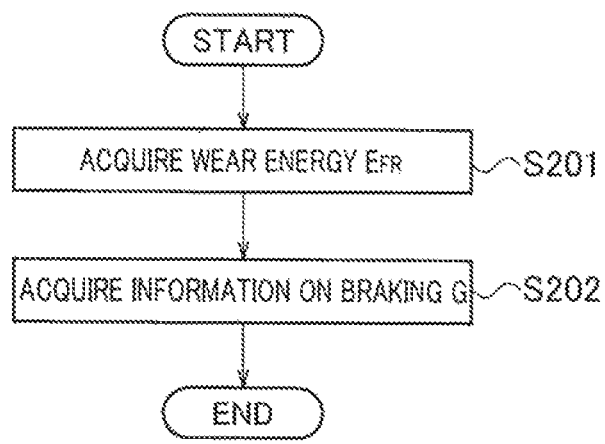
FIG. 9 is a flowchart for illustrating an operation of the tire wear amount estimation device according to the present embodiment of the present invention.

An example of operation of the tire wear amount estimation device 30 is described below with reference to FIG. 9.

In step S201, the tire wear amount estimation device 30 acquires wear energy $E_{FR}$ of the aircraft tires during taxiing.

The term "taxiing" refers to a state in which the aircraft runs on the ground (mainly a runway) under the power of the aircraft. The state of taxiing includes a state of a free rolling run, a state of a decelerating run, and a state of a circling run. The state of the free rolling run refers to a state in which the aircraft runs straight by rolling without braking force acting on the aircraft tires. The state of the decelerating run refers to a running state when the braking force is applied to the aircraft tires. The state of the circling run refers to a running state when a slip angle is applied to the aircraft tires.

The wear energy $E_{FR}$ is energy per unit area produced at a particular point on the surface of the corresponding aircraft tire when the aircraft tire passes through a road surface once, and its unit is $J/m^2$. The wear energy $E_{FR}$ is particularly wear energy during the state of the free rolling run. The tire wear amount estimation device 30 may acquire the wear energy $E_{FR}$ through laboratory testing, or may acquire the wear energy $E_{FR}$ by a finite element method (FEM).

Figure 10:
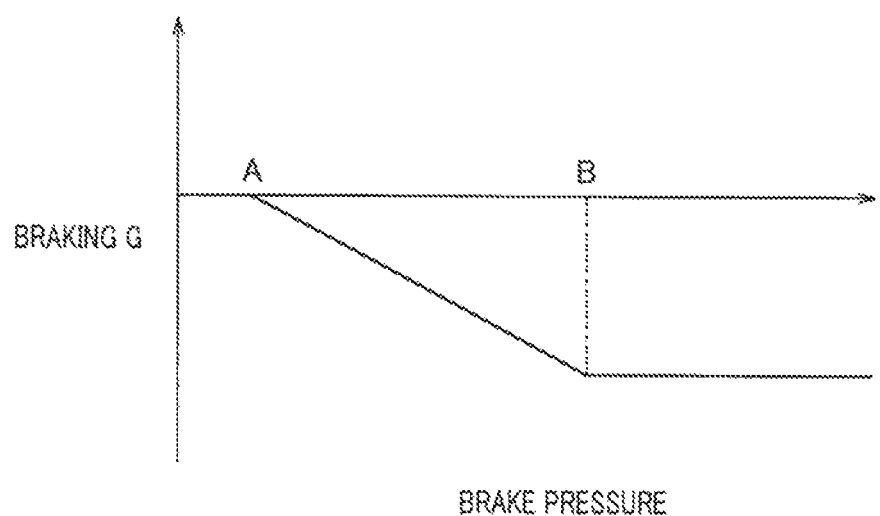
FIG. 10 is a graph showing a relationship between braking G and a brake pressure.

The process proceeds to step S202, and the tire wear amount estimation device 30 acquires information on braking G acting on the body of the aircraft. In particular, the tire wear amount estimation device 30 acquires information about the braking G acting on the body and a brake signal. The brake signal refers to a brake pressure regarding a hydraulic brake. The braking force of the body is not achieved only with the aircraft tires, which is different from typical automobiles. The braking G of the body does not correspond to the braking G acting on the aircraft tires. The tire wear amount estimation device 30 thus obtains the braking G applied to the aircraft tires so as to estimate the wear amount of the aircraft tires. As shown in FIG. 10, a predetermined value A is a point at which the braking force of a brake and a propulsive force of an engine are balanced, while the braking G is not led to any negative number when the brake pressure is the predetermined value A or smaller. The braking G does not change when the brake pressure of a predetermined value B or greater is applied. This braking force of the brake is given by the following function represented by the formula A1:

[Math. 1]

$$G_x^{BR}=\min(0,\max(G_{max}^{BR},f(BP)))  \quad (A1)$$

where BP is the brake pressure, and $G_{MAX}^{BR}$ is the maximum braking G of the brake. $G_{MAX}^{BR}$ is normally a negative number.

The braking force of the brake is given by the following function represented by the formula A2 when subjected to a linear approximation as shown in FIG. 10:

[Math. 2]

$$G_x^{BR}=\min(0,\max(G_{max}^{BR},a \times BP+b)) \quad (A2)$$

where a and b are constants assigned to each body.

The tire wear amount estimation device 30 can calculate the braking G acting on the aircraft tires according to the above formula A2 at a predetermined timing. While the above process has been illustrated with the hydraulic brake, the aircraft is not limited to the hydraulic brake to be equipped. The aircraft may be equipped with an electric brake. The tire wear amount estimation device 30 can also calculate the braking G when the aircraft tire is equipped with an electric brake in the same manner as described above.

Figure 11:
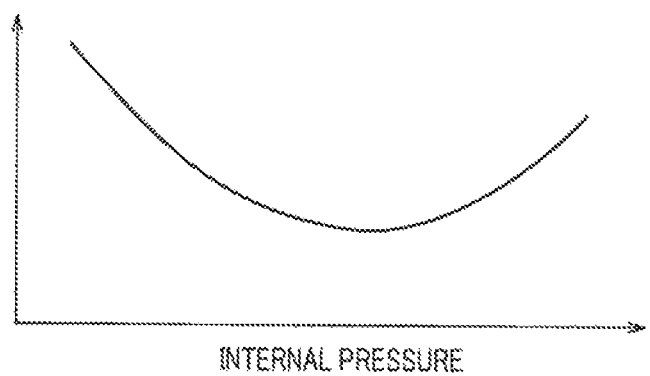
FIG. 11 is a graph showing a relationship between an internal pressure of the aircraft tire and wear energy.

The tire wear amount estimation device 30 according to the present embodiment changes the internal pressure of the aircraft tires on the basis of the wear energy $E_{FR}$ during the state of the free rolling run, and acquires wear energy $E_P$ which depends on the internal pressure. As shown in FIG. 11, the wear energy $E_P$ is represented by a quadratic function. A relationship between ribs formed on the aircraft tires and the wear energy $E_{FR}$ is described below with reference to FIG. 16. While the following explanation is made with regard to the aircraft tires for a main gear illustrated in FIG. 16, the same is also applied to the aircraft tires for a nose gear.

Figure 16:
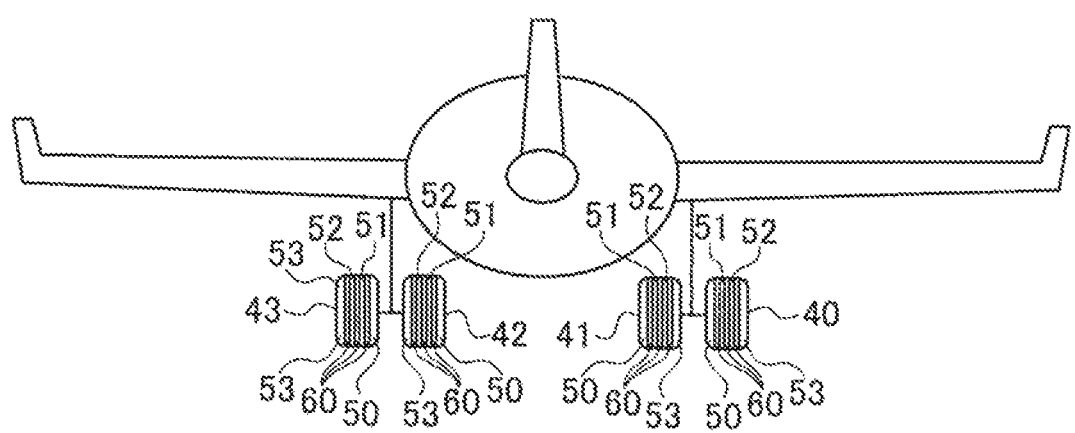
FIG. 16 is a back view illustrating circumferential grooves and ribs provided on the aircraft tires.

As illustrated in FIG. 16, the respective aircraft tires 40 to 43 are provided with a plurality of circumferential grooves 60 (three in FIG. 16) extending in the tire circumferential direction on the tread track, and are provided with a plurality of ribs (four in FIGS. 16) 50 to 53 defined by the respective circumferential grooves 60. The ribs 50, 51, 52, and 53 are arranged in this order from the central side to the outer side of the body. The wear energy $E_{FR}$ varies depending on the positions of the ribs. The tire wear amount estimation device 30 then acquires the wear energy $E_{FR}$ of the respective ribs 50 to 53 of one aircraft tire. The tire wear amount estimation device 30 may acquire, as the wear energy $E_{FR}$, an average value of the wear energy $E_{FR}$ regarding the rib 50 closest to the central side and the wear energy $E_{FR}$ regarding the rib 53 on the outermost side.

The wear energy $E_P$, which depends on the internal pressure of the aircraft tires, also varies depending on the positions of the ribs shown in FIG. 16. When the positions of the ribs of the aircraft tires are represented by use of a variable i in the state in which the aircraft tires are mounted on the aircraft, the wear energy $E_P$ is given by the following formula A3:

[Math. 3]

$$E_P^i(P)=a_P P^2+b_P P+c_P \quad (A3)$$

where i is the position of each rib of the aircraft tire, P is the internal pressure of the aircraft tire, and $a_P$, $b_P$, and $c_P$ are constants.

Figure 12:
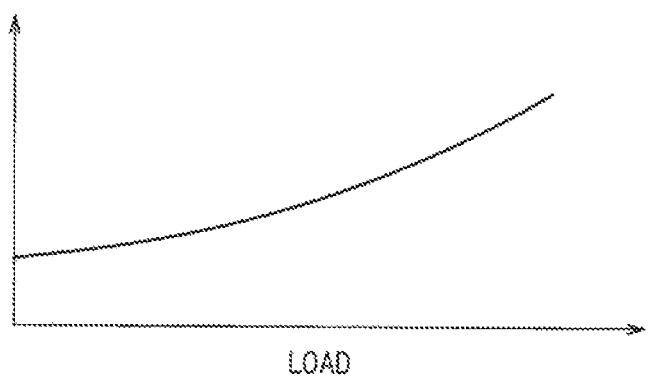
FIG. 12 is a graph showing a relationship between a load acting on the aircraft tire and the wear energy.
Figure 13:
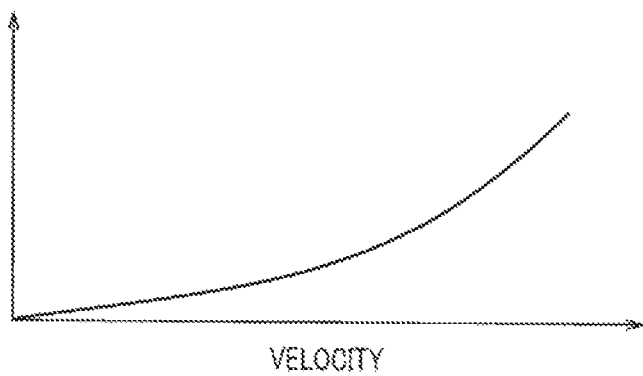
FIG. 13 is a graph showing a relationship between a velocity of the aircraft and the wear energy.

The tire wear amount estimation device 30 also changes the load applied to the aircraft tires on the basis of the wear energy $E_{FR}$ during the state of the free rolling run, and acquires wear energy $E_L$ which depends on the load. As shown in FIG. 12, the wear energy $E_L$ is represented by a quadratic function. The wear energy $E_L$ also varies depending on the positions of the ribs shown in FIG. 16, as in the case of the wear energy $E_P$. When the positions of the ribs of the aircraft tires are represented by use of the variable i in the state in which the aircraft tires are mounted on the aircraft, the wear energy $E_L$ is given by the following formula A4:

[Math. 4]

$$E_L^i(L)=a_L L^2+b_L L+c_L \quad (A4)$$

where i is the position of each rib of the aircraft tire, L is the load applied to the aircraft tire, and $a_L$, $b_L$, and $c_L$ are constants.

The tire wear amount estimation device 30 also changes the velocity of the aircraft on the basis of the wear energy $E_{FR}$ during the state of the free rolling run, and acquires wear energy $E_V$ which depends on the velocity. As shown in FIG.

13, the wear energy $B_V$ is represented by a quadratic function. The wear energy $E_V$ also varies depending on the positions of the ribs shown in FIG. 16, as in the case of the wear energy $E_P$. When the positions of the ribs of the aircraft tires are represented by use of the variable i in the state in which the aircraft tires are mounted on the aircraft, the wear energy $E_L$ is given by the following formula A5:

[Math. 5]

$$E_V^i(V) = a_V V^2 + b_V V + c_V \quad (A5)$$

where i is the position of each rib of the aircraft tire, V is the velocity of the aircraft, and $a_V$, $b_V$, and $c_V$ are constants.

Figure 14:
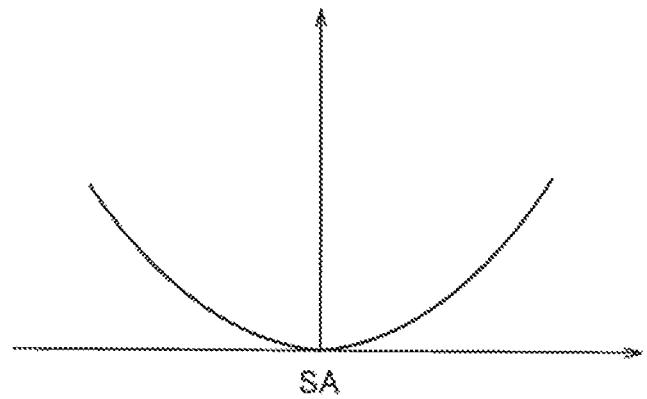
FIG. 14 is a graph showing a relationship between a slip angle caused in the aircraft tire and the wear energy.

The tire wear amount estimation device 30 also changes the slip angle (SA) of the aircraft tires, and acquires wear energy $E_S$ depending on the SA as a difference from the wear energy $E_{FR}$ in the state of the free rolling run. As shown in FIG. 14, the wear energy $E_S$ is represented by a quadratic function. The wear energy $E_S$ also varies depending on the positions of the ribs shown in FIG. 16, as in the case of the wear energy $E_P$. When the positions of the ribs of the aircraft tires are represented by use of the variable i in the state in which the aircraft tires are mounted on the aircraft, the wear energy $E_S$ is given by the following formula A6:

[Math. 6]

$$\Delta E_S^i(SA) = a_S(SA)^2 + b_S(SA) + c_S - E_{FR} \quad (A6)$$

where i is the position of each rib of the aircraft tire, SA is the slip angle, and $a_S$, $b_S$, and $c_S$ are constants.

Figure 15:
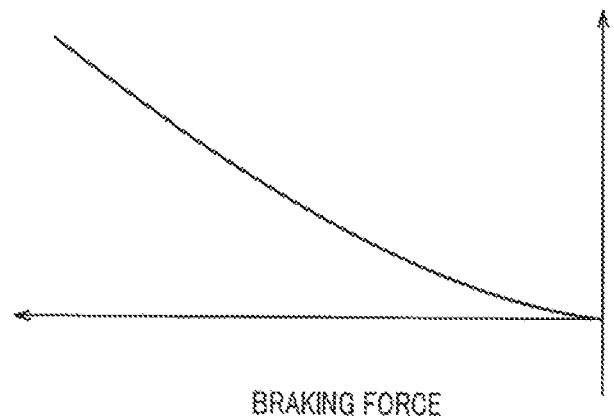
FIG. 15 is a graph showing a relationship between a braking force of the aircraft and the wear energy.

The tire wear amount estimation device 30 also changes the braking force of the aircraft, and acquires wear energy $E_B$ depending on the breaking force as a difference from the wear energy $E_{FR}$ in the state of the free rolling run. As shown in FIG. 15, the wear energy $E_B$ is represented by a quadratic function. The wear energy $E_B$ also varies depending on the positions of the ribs shown in FIG. 16, as in the case of the wear energy $E_P$. When the positions of the ribs of the aircraft tires are represented by use of the variable i in the state in which the aircraft tires are mounted on the aircraft, the wear energy $E_B$ is given by the following formula A7:

[Math. 7]

$$\Delta E_B^i(G_x^{BR}) = a_B(G_x^{BR})^2 + b_B(G_x^{BR}) + c_B - E_{FR} \quad (A7)$$

where i is the position of each rib of the aircraft tire, $G_x^{BR}$ is the braking force of the aircraft, and $a_B$, $b_B$, and $c_B$ are constants.

Next, an example of an estimating process of the tire wear amount estimation device 30 is described below with reference to FIG. 17. The estimating process of the tire wear amount estimation device 30 includes six steps (step S301 to step S306).

In step S301, the tire wear amount estimation device 30 acquires pieces of information on the aircraft from the airline 32. In particular, the tire wear amount estimation device 30 acquires the velocity of the aircraft, the acceleration of the aircraft, the current position of the aircraft, the direction of the nose of the aircraft, the total weight of the aircraft, the internal pressure and the positions of the ribs of the respective aircraft tires mounted on the aircraft, the brake pressure of the aircraft, the circling angle of the body, the circling radius of the body, and the steering angle of the steering wheel, for example. The tire wear amount estimation device 30 also acquires the time when the respective pieces of the information are acquired.

The process proceeds to step S302, and the tire wear amount estimation device 30 calculates a wheel load (a load) of the aircraft tires. The wheel load of the aircraft tires is obtained from a static load and a dynamic load.

The tire wear amount estimation device 30 first calculates the position of the center of gravity of the body when calculating the wheel load of the aircraft tires. The position of the center of gravity of the body varies depending on the seating positions of passengers or baggage. In the technical field of aircrafts, a method is known that confirms the weight and the position of the center of gravity in accordance with the provisions of the law (the aviation law). The position of the center of gravity during flight can be measured relative to a mean dynamic chord (MAC), so as to calculate the position of the center of gravity in association with the positional information of the MAC. For example, when the position of the center of gravity is calculated with a coordinate system based on the nose gear, the position of the center of gravity of the body can be calculated according to the mathematical expression of L1+L2×% MAC, where L1 is a distance from the nose gear to the front edge of the MAC position, and L2 is a MAC length of the body. L1 and L2 can be typically obtained from the body specifications. In addition, % MAC is available as the information prescribed in the aviation law.

Figure 18:
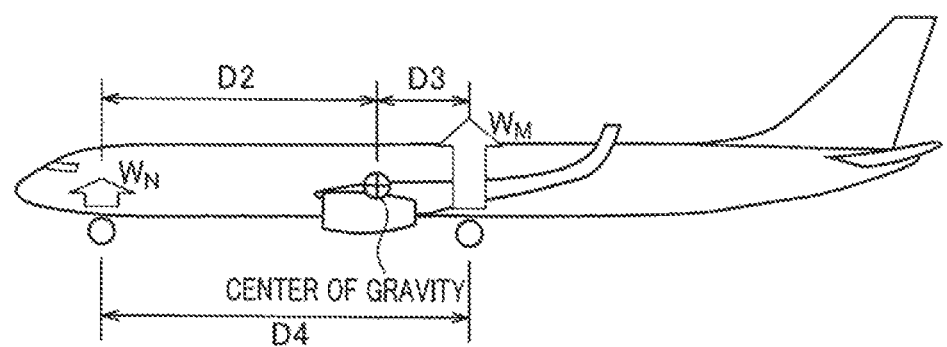
FIG. 18 is a side view for illustrating a static load of the aircraft.

The static load of the aircraft tires is described below with reference to FIG. 18. When the influence of the velocity of the aircraft is small, such as the state of taxiing, namely, when the influence of a lifting force can be ignored, the static load is calculated in accordance with a balance of a moment about the center of gravity acting on the body. As illustrated in FIG. 18, the total weight $W_N$ of the nose gear is represented by the following formula A8:

[Math. 8]

$$W_N = W \times \frac{D3}{D4} \quad (A8)$$

where W is the total weight of the body, D3 is a distance from the position of the center of gravity to the main gear, and D4 is a distance from the nose gear to the main gear.

Similarly, as illustrated in FIG. 18, the total weight $W_M$ of the main gear is represented by the following formula A9:

[Math. 9]

$$W_M = W \times \frac{D2}{D4} \quad (A9)$$

where D2 is a distance from the nose gear to the position of the center of gravity.

When the load applied to the aircraft tires is presumed to be distributed evenly, the wheel load of the respective aircraft tires mounted on the nose gear is obtained by dividing the total weight $W_N$ by the number of the tires mounted on the nose gear. In addition, the wheel load of the respective aircraft tires mounted on the main gear is obtained by dividing the total weight $W_M$ by the number of the tires mounted on the main gear. When there is measurement data on the wheel load, the distribution is preferably made according to the data.

The lifting force $G_{lift}$ is generated depending on the velocity when the aircraft takes off, which is represented by the following formula A10:

[Math. 10]

$$G_{lift} = cV^2 \quad (A10)$$

where c is a constant, and v is the velocity of the aircraft.

The acceleration in the vertical direction measured in the body of the aircraft when taking off gradually decreases as the aircraft accelerates. As in the case of the braking G described in step S302 shown in FIG. 9, a relationship between the acceleration of the body in the vertical direction and the square of the velocity is preliminarily obtained, so as to calculate the total weight W that the aircraft tires bear during takeoff. The total weight W that the aircraft tires bear during takeoff is represented by the following formula A11:

[Math. 11]

$$W = M(1 - G_{lift}) \tag{A11}$$

where M is the total weight of the body, which is the same value as W in the unit system of kg and kgf.

The dynamic load of the aircraft tires is described below with reference to FIG. 19 and FIG. 20. A load shift due to the acceleration in the front-rear direction acting on the center of gravity of the body is first described below with reference to FIG. 19.

Figure 19:
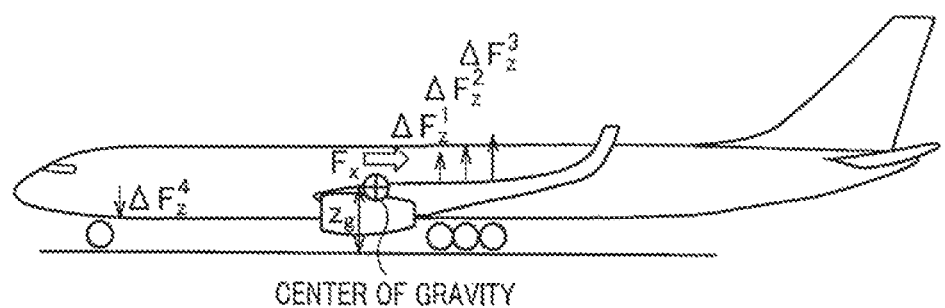
FIG. 19 is a side view for illustrating a dynamic load of the aircraft.

As illustrated in FIG. 19, when a load change of the respective aircraft tires is represented by $\Delta F_z^j$ (j: the mounted position of each aircraft tire), the following formula A12 and formula A13 need to be fulfilled in view of the balance of the acceleration in the front-rear direction of the body with the moment, and the total weight of the body which is constant:

[Math. 12]

$$z_g F_x = \sum_{j=1}^{N} \Delta F_z^j x^j \tag{A12}$$

[Math. 13]

$$\sum_{j=1}^{N} \Delta F_z^j = 0 \tag{A13}$$

where j is the mounted position of each aircraft tire, N is the total number of the aircraft tries mounted on the main gear, Zg is the distance from the ground to the position of the center of gravity, and Fx is the moment due to the acceleration in the front-rear direction of the body.

When the load shift is presumed to be proportional to the position in the front-rear direction, the load change $\Delta F_z^j$ is represented by the following formula A14:

[Math. 14]

$$\Delta F_z^j = \alpha_x x_j + \beta_x \tag{A14}$$

Since the total weight of the aircraft is constant, the following formula A15 and formula A16 are fulfilled:

[Math. 15]

$$\sum_{j=1}^{N} \Delta F_z^j = \alpha_x \sum_{j=1}^{N} x^j + N\beta_x = 0 \tag{A15}$$

[Math. 16]

$$\beta_x = -\frac{\alpha_x \sum_{j=1}^{N} x^j}{N} \tag{A16}$$

The following formula A17 and formula A18 are fulfilled due to the balance of the moment:

[Math. 17]

$$z_g F_x = \sum_{j=1}^{N} \Delta F_z^j x^j = \alpha_x \sum_{j=1}^{N} (x^j)^2 - \frac{\alpha_x}{N}\left(\sum_{j=1}^{N} x^j\right)^2 = \alpha_x \left\{\sum_{j=1}^{N} (x^j)^2 - \frac{1}{N}\left(\sum_{j=1}^{N} x^j\right)^2\right\} \tag{A17}$$

[Math. 18]

$$\alpha_x = \frac{z_g F_x}{\left\{\sum_{j=1}^{N} (x^j)^2 - \frac{1}{N}\left(\sum_{j=1}^{N} x^j\right)^2\right\}} \tag{A18}$$

As described above, the tire wear amount estimation device 30 can calculate the load variation at the position of the corresponding aircraft tire caused by the acceleration in the front-rear direction of the body.

A load shift due to the acceleration in the right-left direction (the lateral direction) acting on the center of gravity of the body is then described below with reference to FIG. 20.

Figure 20:
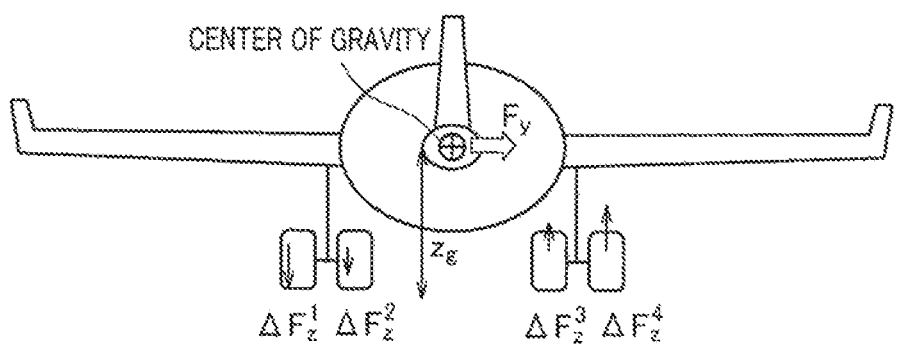
FIG. 20 is a back view for illustrating the dynamic load of the aircraft.

As illustrated in FIG. 20, when the load change of the respective aircraft tires is represented by $\Delta F_z^j$ (j: the mounted position of each aircraft tire), the following formula A19 and formula A20 need to be fulfilled in view of the balance of the acceleration in the right-left direction of the body with the moment, and the total weight of the body which is constant:

[Math. 19]

$$z_g F_y = \sum_{j=1}^{N} \Delta F_z^j y^j \tag{A19}$$

[Math. 20]

$$\sum_{j=1}^{N} \Delta F_z^j = 0 \tag{A20}$$

where j is the mounted position of each aircraft tire, N is the total number of the aircraft tries mounted on the main gear, Zg is the distance from the ground to the position of the center of gravity, and Fy is the moment due to the acceleration in the right-left direction of the body.

When the load shift is presumed to be proportional to the position in the right-left direction, the condition in which the total weight of the body is constant is fulfilled as long as the aircraft tires are symmetrically mounted, so as to fulfill the following formula A21:

[Math. 21]

$$\Delta F_z^j = \alpha_y y_j \tag{A21}$$

The following formula A22 is fulfilled due to the balance of the moment:

[Math. 22]

$$\alpha_y = \frac{z_g F_y}{\sum_{j=1}^{N} y_j^2} \tag{A22}$$

As described above, the tire wear amount estimation device 30 can calculate the load variation at the position of the corresponding aircraft tire caused by the acceleration in the right-left direction of the body.

The dynamic load (the change) caused due to the acceleration of the body is represented by the following formula A23 when using the load shift as described with reference to FIG. 19 and FIG. 20:

[Math. 23]

$$\Delta F_z^j = \alpha_x x_j + \beta_x + \alpha_y y_j = \frac{z_g F_x}{\left\{\sum_{j=1}^{N}(x^j)^2 - \frac{1}{N}\left(\sum_{j=1}^{N}x^j\right)^2\right\}} \cdot \left(x_j - \frac{\sum_{j=1}^{N}x^j}{N}\right) + \frac{z_g F_y}{\sum_{j=1}^{N}y_j^2} \cdot y_j \quad (A23)$$

For example, the wheel load acting on the respective aircraft tires of the main gear is represented by the following formula A24:

[Math. 24]

$$W^j = W_M^s + \Delta F_z^j = W_M^s + \frac{z_g F_x}{\left\{\sum_{j=1}^{N}(x^j)^2 - \frac{1}{N}\left(\sum_{j=1}^{N}x^j\right)^2\right\}} \cdot \left(x_j - \frac{\sum_{j=1}^{N}x^j}{N}\right) + \frac{z_g F_y}{\sum_{j=1}^{N}y_j^2} \cdot y_j \quad (A24)$$

where $W_M^S$ is the wheel load with no acceleration in the front-rear direction or no acceleration in the right-left direction.

$W_M^S$ is given by the following formula A25:

[Math. 25]

$$W_M^s = \frac{W_M}{N} \quad (A25)$$

where N is the total number of the aircraft tires mounted on the main gear. As described above, the wheel load differs between the state of taxiing and the state of takeoff.

Figure 17:
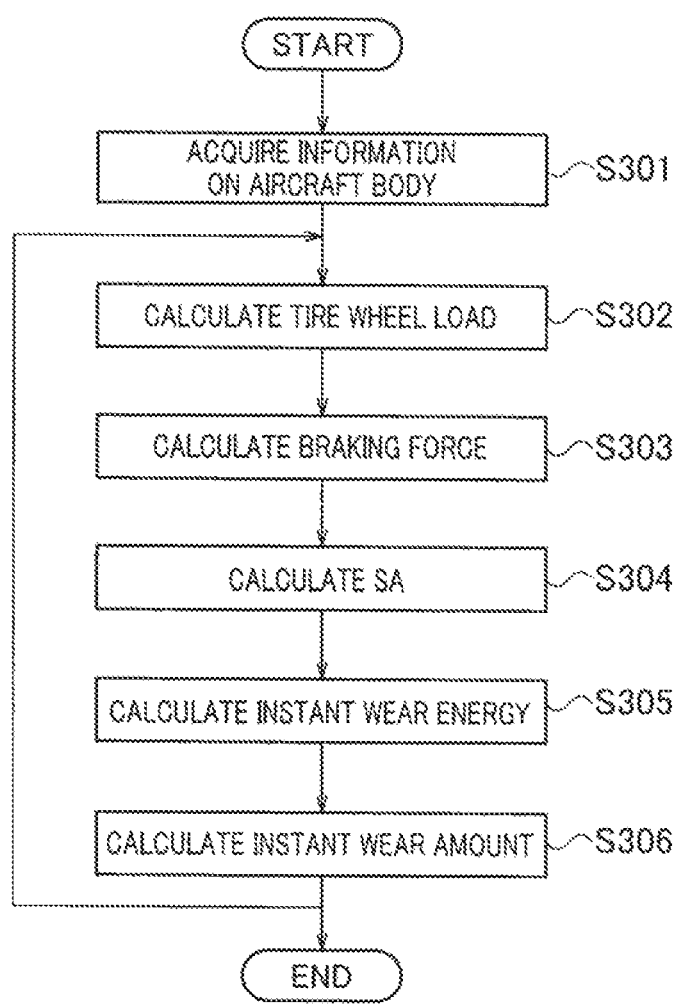
FIG. 17 is a flowchart for illustrating an operation of the tire wear amount estimation device according to the present embodiment of the present invention.

The process proceeds to step S303 shown in FIG. 17, and the tire wear amount estimation device 30 acquires the brake pressure of the aircraft to calculate the braking force. The method of calculating the braking force can be the same as described in step S202 shown in FIG. 9.

The process proceeds to step S304, and the tire wear amount estimation device 30 acquires the circling angle and the circling radius of the body, and the steering angle of the steering wheel so as to calculate the SA of the aircraft tires. The method of calculating the SA of the aircraft tires can be the same as a calculation method for a SA of automobile tires, and the specific explanations are not made below.

The process proceeds to step S305, and the tire wear amount estimation device 30 calculates instant wear energy $dE_w$. The instant wear energy $dE_w$ refers to wear energy generated during a quite short period of time dt, and is represented by the following formula A26 by use of the above formulas A3 to A7:

[Math. 26]

$$dE_w^i = E_P^i(P) \cdot E_L^i(L) \cdot E_V^i(V) \cdot \{E_{FR}^i + \Delta E_S^i(S) + \Delta E_B^i(B)\} \cdot \frac{Vdt}{2\pi r} \quad (A26)$$

where r is the circling radius of the body.

The wear energy $E_w$ generated during taxiing is obtained by integrating the formula A26 with the time T (a predetermined time) during which the aircraft is taxiing, and is represented by the following formula A27:

[Math. 27]

$$E_w^i = \int_0^T dE_w^i \quad (A27)$$

The formula A27 can be approximated by the following formula A28 when the sampling period is represented by $\Delta T$:

[Math. 28]

$$E_w^i = \int_0^T dE_w^i \approx \sum E_P^i(P) \cdot E_L^i(L) \cdot E_V^i(V) \cdot \{E_{FR}^i + \Delta E_S^i(S) + \Delta E_B^i(B)\} \cdot \frac{V\Delta t}{2\pi r} \quad (A28)$$

The process proceeds to step S306, and the tire wear amount estimation device 30 calculates an instant wear amount $dwear^i$ of the aircraft tires based on the calculated instant wear energy $dE_w$. For example, the tire wear amount estimation device 30 can calculate the instant wear amount of the aircraft tires by use of the instant wear energy $dE_w$ and a wear resistance R. The wear resistance R is represented by the following formula A29 by use of wear energy E' per flight and the wear amount w' per flight calculated from the behavior of the body during an average flight (between an airport and an airport), for example. Namely, the wear resistance R indicates the relationship between predetermined wear energy and a predetermined wear amount.

[Math. 29]

$$R = \frac{E'}{w'} \quad (A29)$$

The instant wear amount $dwear^i$ of the aircraft tires is represented by the following formula A30:

[Math. 30]

$$dwear^i = \frac{dE_w^i}{R} \quad (A30)$$

The tire wear amount estimation device 30 repeatedly executes the process from step S302 to step S306 per quite short period of time dt, so as to calculate the wear amount $wear^i$ of the aircraft tires. The wear amount $wear^i$ of the aircraft tires during the time T in which the aircraft is taxiing is represented by the following formula A31:

[Math. 31]

$$wear^i = \frac{E_w^i}{R} \quad (A31)$$

(8) Functional Block Configuration Example of Tire Management Server

As described above, the tire wear amount estimation device 30 estimates the wear amount of the aircraft tires according to the internal pressure of the aircraft tires actually used, the load applied to the aircraft tires, the velocity of the aircraft, the slip angle generated in the aircraft tires, and the braking force of the aircraft tires. The tire wear amount estimation device 30 thus can estimate the wear amount of the aircraft tires with a high accuracy in the situation in which the aircraft tires are actually used.

The wear amount estimated by the tire wear amount estimation device 30 may encompass an error. The tire management server 200 then calculates an error of the wear amount estimated by the tire wear amount estimation device 30 so as to correct the wear amount estimated by the tire wear amount estimation device 30.

An example of a functional block configuration of the tire management server 200 having the function described above is described below with reference to FIG. 21.

Figure 21:
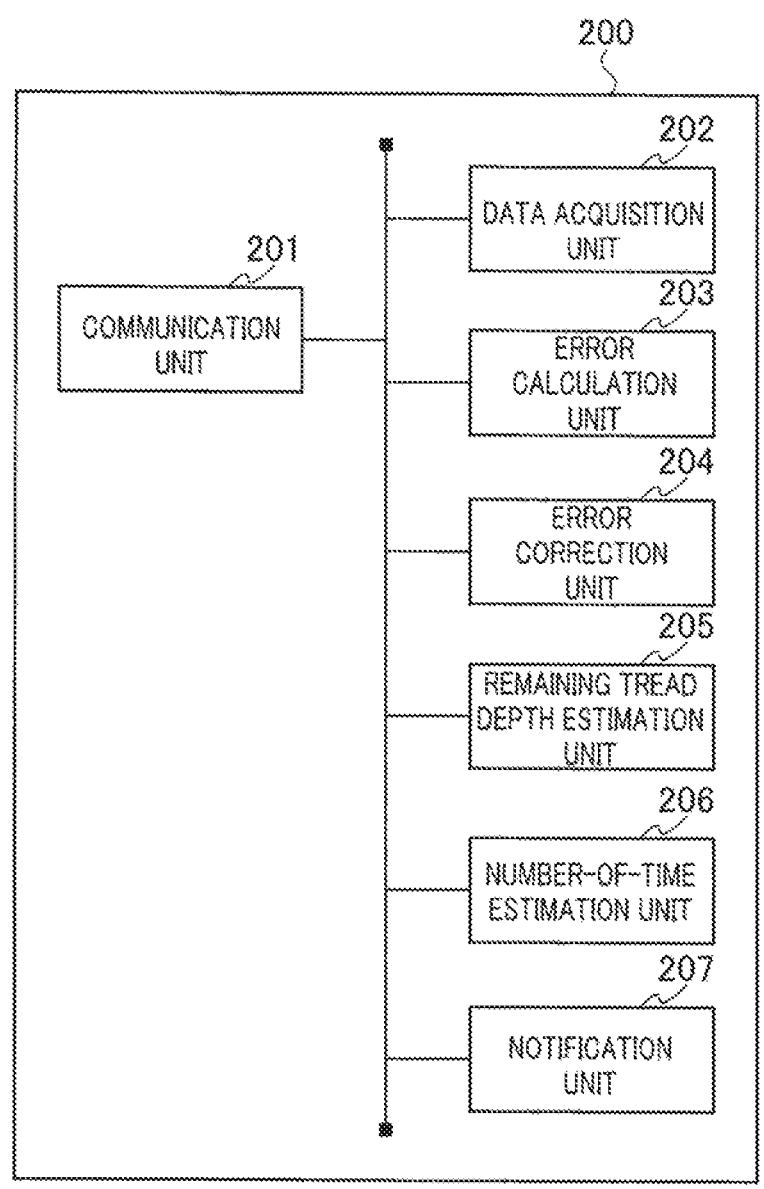
FIG. 21 is a functional block configuration diagram of a tire management server according to the present embodiment of the present invention.

As illustrated in FIG. 21, the tire management server 200 includes a communication unit 201, a data acquisition unit 202, an error calculation unit 203, an error correction unit 204, a remaining tread depth estimation unit 205, a number-of-times estimation unit 206, and a notification unit 207. The tire management server 200 can be implemented by a general-purpose server computer including a processor and a memory, for example.

The communication unit 201 provides an interface necessary for communication executed via the communication network 20 (refer to FIG. 1). According to the present embodiment, the communication unit 201 provides the interface (such as a wireless LAN) so as to be connected to the communication network 20 in a wireless communication manner.

The data acquisition unit 202 acquires, from the remaining tire tread depth measurement device 100, the remaining tread depth of at least one of the aircraft tires measured by the remaining tire tread depth measurement device 100. The data acquisition unit 202 also acquires, from the tire wear amount estimation device 30, the wear amount of all of the aircraft tires estimated by the wear amount estimation device 30. The data acquisition unit 202 stores the acquired data. Hereinafter, the aircraft tires as a target to be measured by the remaining tire tread depth measurement device 100 may also be referred to as "first aircraft tires" for illustration purposes.

The error calculation unit 203 calculates an error of the wear amount of the respective first aircraft tires in accordance with the remaining tread depth (measurement data) of the respective first aircraft tires and the wear amount (estimation data) of the respective first aircraft tires acquired by the data acquisition unit 202. The error calculation unit 203 compares the remaining tread depth of the respective first aircraft tires with the remaining tread depth of the corresponding first aircraft tires before being used, and calculates the percentage of the remaining tread depth of the respective first aircraft tires with respect to that before being used. The error calculation unit 203 calculates an error of the wear amount of the respective first aircraft tires in accordance with the wear amount and the percentage of the remaining tread depth calculated as described above. The relationship between the percentage of the remaining tread depth and the wear amount is widely known, and the specific explanations are not made below.

The error correction unit 204 (a first error correction unit, a second error correction unit) corrects the error calculated by the error calculation unit 203. The error correction unit 204 obtains a correction coefficient of the estimation data with respect to the measurement data, for example, so as to correct the error in accordance with the correction coefficient. The error correction unit 204 thus can correct the error of the wear amount of the respective first aircraft tires. While the plural aircraft tires are mounted on the aircraft in addition to the first aircraft tires, only part of the aircraft tires is subjected to the measurement of the remaining tread depth by the remaining tire tread depth measurement device 100. When the wear amount of the part of the aircraft tires subjected to the measurement of the remaining tread depth by the remaining tire tread depth measurement device 100 is corrected, the method described above can be applied. When the wear amount of the other aircraft tires is corrected, however, the above method cannot be applied since there is no measurement data on the remaining tread depth. The term "other aircraft tires" refers to the aircraft tires which are not a target to be subjected to the measurement by the remaining tire tread depth measurement device 100. The term "part of the aircraft tires" refers to the aircraft tires 70 as a target to be subjected to the measurement by the remaining tire tread depth measurement device 100.

The error correction unit 204 then corrects the wear amount of the other aircraft tires by use of the correction coefficient used when the wear amount of the part of the aircraft tires is corrected. The error correction unit 204 thus can also correct the wear amount of the other aircraft tires having no data on the remaining tread depth. Namely, the error correction unit 204 can correct the wear amount of all of the aircraft tires. As described above, since the wear amount of the aircraft tires estimated by the tire wear amount estimation device 30 has a high accuracy, the correction by the error correction unit 204 can further increase the accuracy of the wear amount corrected.

The remaining tread depth estimation unit 205 estimates the remaining tread depth of all of the aircraft tires mounted on the aircraft in accordance with the wear amount corrected by the error correction unit 204.

The number-of-times estimation unit 206 estimates the number of available flight times of all of the aircraft tires mounted on the aircraft according to the wear amount corrected by the error correction unit 204 and a flight schedule. The number-of-times estimation unit 206 can acquire pieces of information such as an airport used for the next flight and a distance required for taxiing in the corresponding airport according to the flight schedule. The tire wear amount estimation device 30 uses the information so as to estimate the wear amount during the next flight. The error correction unit 204 then corrects the error of the wear amount on the next flight. The wear amount during the next flight thus can be estimated with a high accuracy. The number-of-times estimation unit 206 can use the accurate wear amount, so as to estimate the number of available flight times of all of the aircraft tires mounted on the aircraft. The number-of-times estimation unit 206 can acquire the flight schedule from the airline 32.

The notification unit 207 notifies a predetermined notification target of the remaining tread depth estimated by the remaining tread depth estimation unit 205 and the number of available flight times estimated by the number-of-times estimation unit 206. In particular, the notification unit 207 notifies the airline 32 or the mobile terminal 34 of the estimated remaining tread depth and the estimated number of available flight times. The airline 32 or the user 33 (the mechanic) who operates the mobile terminal 34 thus can recognize the remaining tread depth and the number of available flight times of all of the aircraft tires. This can ensure an efficient supply chain system of the aircraft tires. The user 33 can also shorten the time necessary for the inspection of the aircraft tires due to this system. The notification unit 207 may provide the notification about the remaining tread depth and the number of available flight times in real time. The notification unit 207 may notify the tire manufacturer 31 of the estimated remaining tread depth. The notification unit 207 may provide the notification to the tire manufacturer 31 or the user 33 when the estimated remaining tread depth is a predetermined value or smaller. The predetermined value is an estimate for replacement, for example. The tire manufacturer 31 or the user 33 thus can accurately recognize the time for replacement for the aircraft tires, so as to be ready for the replacement accordingly.

(9) Example of Operation Tire Management Server

Figure 22:
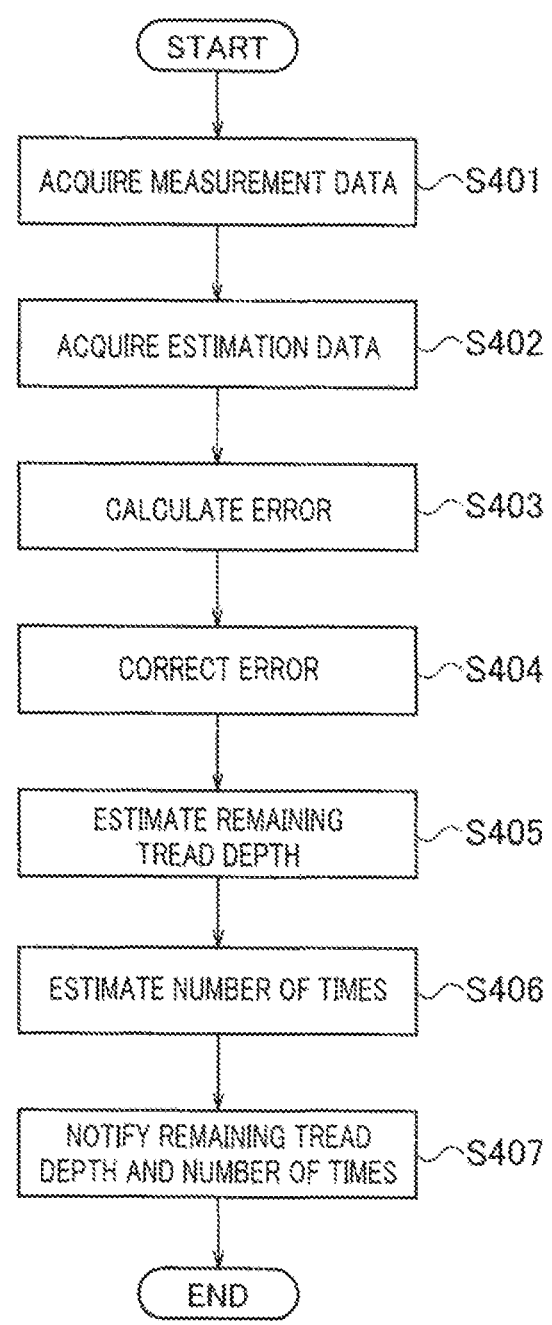
FIG. 22 is a flowchart for illustrating an operation of the tire management server according to the present embodiment of the present invention.

An example of operation of the tire management server 200 is described below with reference to FIG. 22.

In step S401, the data acquisition unit 202 acquires, from the remaining tire tread depth measurement device 100, the remaining tread depth of at least one of the aircraft tires measured by the remaining tire tread depth measurement device 100. The process proceeds to step S402, and the data acquisition unit 202 acquires, from the tire wear amount estimation device 30, the wear amount of all of the aircraft tires estimated by the wear amount estimation device 30.

The process proceeds to step S403, and the error calculation unit 203 calculates the error of the wear amount of the corresponding first aircraft tire in accordance with the remaining tread depth (the measurement data) of the first aircraft tire and the wear amount (the estimation data) of the first aircraft tire acquired by the data acquisition unit 202. The process proceeds to step S404, and the error correction unit 204 corrects the error calculated by the error calculation unit 203. The process proceeds to step S405, and the remaining tread depth estimation unit 205 estimates the remaining tread depth of all of the aircraft tires mounted on the aircraft in accordance with the wear amount corrected by the error correction unit 204. The process proceeds to step S406, and the number-of-times estimation unit 206 estimates the number of available flight times of all of the aircraft tires mounted on the aircraft according to the wear amount corrected by the error correction unit 204 and the flight schedule. The process proceeds to step S407, and the notification unit 207 notifies the predetermined notification target of the remaining tread depth estimated by the remaining tread depth estimation unit 205 and the number of available flight times estimated by the number-of-times estimation unit 206.

(10) Operational Effects

The present embodiment described above can achieve the following operational effects. In particular, the housing part 110 of the remaining tire tread depth measurement device 100 has the inclined surface 111 which is to face the tread 71 of the aircraft tire 70. The measurement unit 121 of the laser displacement sensor 120 is arranged inside the measurement window 111a provided on the inclined surface 111. The laser displacement sensor 120 and the electric slider 130 are housed in the housing part 110.

The housing part 110 having the inclined surface 111 and serving as a wheel chock can lock the aircraft tire 70 mounted on the aircraft.

The housing part 110, serving as a wheel chock and housing the laser displacement sensor 120 and the electric slider 130, can measure the depth of the groove 72 (the remaining tread depth) every time the user 33 inspects the aircraft tires 70.

Namely, the remaining tire tread depth measurement device 100 can regularly measure the remaining tread depth of the aircraft tires 70 accurately for a short period of time.

The housing part 110 has the inclined surface 111 and the back surface 113 which are longer than the paired side surfaces 114, as in the case of typical wheel chocks, and the measurement window 111a provided on the inclined surface 111, which extends in the tire width direction Tw (the predetermined direction). The housing part 110 thus can allow the laser displacement sensor 120 to move sufficiently in the tire width direction Tw. This can accurately measure the remaining tread depth in the entire width of the tread 71 regardless of whether the stop position of the aircraft in the width direction is slightly displaced.

The tire wear amount estimation device 30 estimates the wear amount of all of the aircraft tires mounted on the aircraft according to the internal pressure of the aircraft tires actually used, the load applied to the aircraft tires, the velocity of the aircraft, the slip angle caused in the aircraft tires, and the braking force of the aircraft tires. The tire wear amount estimation device 30 thus can estimate the wear amount of the aircraft tires with a high accuracy in the situation in which the aircraft tires are actually used. The information acquired from the airline 32 is information without RF tags attached to the aircraft tires. The tire wear amount estimation device 30 thus can accurately measure the wear amount of the aircraft tires without RF tags attached to the aircraft tires.

The tire wear amount estimation device 30 calculates the wear energy $E_P$, the wear energy $E_L$, the wear energy $E_V$, the wear energy $\Delta E_S$, and the wear energy $\Delta E_B$ in accordance with the positions of the ribs of the aircraft tires in the state in which the aircraft tires are mounted on the aircraft. Each of the wear energy varies depending on the positions of the ribs. The tire wear amount estimation device 30 according to the present embodiment calculates each of the wear energy in accordance with the positions of the ribs, so as to accurately estimate the wear amount of the aircraft tires per position of each rib.

The wear amount estimated by the tire wear amount estimation device 30 may encompass an error. The tire management server 200 then calculates an error of the wear amount estimated by the tire wear amount estimation device 30 so as to correct the wear amount estimated by the tire wear amount estimation device 30. The tire management server 200 obtains the correction coefficient of the estimation data with respect to the measurement data, so as to correct the error in accordance with the correction coefficient. The tire management server 200 further corrects the wear amount of the other aircraft tires by use of the correction coefficient used when the wear amount of the part of the aircraft tires is corrected. The tire management server 200 thus can correct the wear amount of all of the aircraft tires. As described above, since the wear amount of the aircraft tires estimated by the tire wear amount estimation device 30 has a high accuracy, the correction by the tire management server 200 can further increase the accuracy of the wear amount. The tire management server 200 using the accurate wear amount can accurately estimate the remaining tread depth of all of the aircraft tires mounted on the aircraft. The tire management server 200 also uses the accurate wear amount and the flight schedule, so as to estimate the number of available flight times of all of the aircraft tires mounted on the aircraft.

The tire management server 200 notifies the predetermined notification target of the estimated remaining tread depth and the estimated number of available flight times. For example, the tire management server 200 notifies the airline 32 or the mobile terminal 34 of the information. The airline 32 or the user 33 (the mechanic) who operates the mobile terminal 34 thus can recognize the remaining tread depth and the number of available flight times of all of the aircraft tires. This can ensure the efficient supply chain system of the aircraft tires. The user 33 can also shorten the time necessary for the inspection of the aircraft tires due to this system. The tire management server 200 may provide the notification about the remaining tread depth and the number of available flight times in real time.

The tire management server 200 may notify the tire manufacturer 31 or the user 33 of the remaining tread depth when the estimated remaining tread depth is a predetermined value or smaller. The tire manufacturer 31 or the user 33 thus can accurately recognize the time for replacement for the aircraft tires, so as to be ready for the replacement accordingly.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

This application is based upon and claims the benefit of priority from Japanese Patent Application No. 2017-239402, filed on Dec. 14, 2017, the entire contents of which are incorporated herein by reference.

REFERENCE SIGNS LIST

10 REMAINING TIRE TREAD DEPTH MANAGEMENT SYSTEM
20 COMMUNICATION NETWORK
30 TIRE WEAR AMOUNT ESTIMATION DEVICE
31 TIRE MANUFACTURER
32 AIRLINE
33 USER
34 MOBILE TERMINAL
40 to 43, 70 AIRCRAFT TIRE
50 to 53 RIB
60 CIRCUMFERENTIAL GROOVE
71 TREAD
72 GROOVE
100 REMAINING TIRE TREAD DEPTH MEASUREMENT DEVICE
101 REMAINING TREAD DEPTH MEASUREMENT UNIT
103 MOVEMENT UNIT
105 IDENTIFICATION INFORMATION ACQUISITION UNIT
107 OUTPUT UNIT
110 HOUSING PART
111 INCLINED SURFACE
111a MEASUREMENT WINDOW
112 TOP SURFACE
113 BACK SURFACE
114 SIDE SURFACE
115 VERTICAL SURFACE
116 BOTTOM SURFACE
120 LASER DISPLACEMENT SENSOR
121 MEASUREMENT UNIT
122 LASER BEAM
130 ELECTRIC SLIDER
140 CONTROL SUBSTRATE
150 DRIVER
160 WIRELESS MODULE
170 BATTERY
200 TIRE MANAGEMENT SERVER
201 COMMUNICATION UNIT
202 DATA ACQUISITION UNIT
203 ERROR CALCULATION UNIT
204 ERROR CORRECTION UNIT
205 REMAINING TREAD DEPTH ESTIMATION UNIT
206 NUMBER-OF-TIMES ESTIMATION UNIT
207 NOTIFICATION UNIT
301 COMMUNICATION UNIT
303 CALCULATION UNIT
305 ESTIMATION UNIT

The invention claimed is:

1. A remaining tire tread depth management system comprising:
a remaining tire tread depth measurement device configured to measure a remaining tread depth of at least one of first aircraft tires mounted on an aircraft;
a tire wear amount estimation device configured to estimate a wear amount of all aircraft tires mounted on the aircraft including the first aircraft tires; and
a tire management server configured to estimate a remaining tread depth of all of the aircraft tires in accordance with measurement data output from the remaining tire tread depth measurement device and estimation data output from the tire wear amount estimation device,
the tire management server including:
an acquisition unit configured to acquire the remaining tread depth of the corresponding first aircraft tire measured by the remaining tire tread depth measurement device, and the wear amount of the corresponding first aircraft tire estimated by the tire wear amount estimation device;
an error calculation unit configured to calculate an error of the wear amount of the first aircraft tire based on the remaining tread depth of the first aircraft tire and the wear amount of the first aircraft tire acquired by the acquisition unit;
a first error correction unit configured to correct the error of the wear amount of the first aircraft tire calculated by the error calculation unit;
a second error correction unit configured to correct the wear amount of the aircraft tires other than the first aircraft tire in accordance with a correction coefficient regarding the error corrected by the first error correction unit;
a remaining tread depth estimation unit configured to estimate a remaining tread depth of all of the aircraft tires in accordance with the wear amount of all of the aircraft tires corrected by the first error correction unit and the second error correction unit;
a number-of-times estimation unit configured to estimate a number of available flight times of all of the aircraft tires mounted on the aircraft in accordance with the wear amount of all of the aircraft tires corrected by the first error correction unit and the second error correction unit and a flight schedule; and
a notification unit configured to notify a predetermined notification target of the remaining tread depth estimated by the remaining tread depth estimation unit and the number of available flight times estimated by the number-of-times estimation unit.

2. The remaining tire tread depth management system according to claim 1, wherein:

the tire wear amount estimation device includes:
- a calculation unit configured to calculate wear energy $E_P$, which depends on an internal pressure of the aircraft tires, in accordance with the internal pressure and wear energy $E_{FR}$ of the aircraft tires in a state of a free rolling run in which the aircraft runs straight by rolling without braking force acting on the aircraft tires; and
- an estimation unit configured to estimate the wear mount wear of the aircraft tires,
- the calculation unit being configured to:
  - calculate wear energy $E_L$, which depends on a load acting on the aircraft tires, in accordance with the load and the wear energy $E_{FR}$;
  - calculate wear energy $E_V$, which depends on a velocity of the aircraft, in accordance with the velocity and the wear energy $E_{FR}$;
  - calculate wear energy $\Delta E_S$, which depends on a slip angle caused in the aircraft tires, in accordance with the slip angle and the wear energy $E_{FR}$; and
  - calculate wear energy $\Delta E_B$, which depends on a braking force of the aircraft, in accordance with the braking force and the wear energy $E_{FR}$,
- the estimation unit being configured to estimate the wear amount wear of the aircraft tires in accordance with the wear energy $E_P$, the wear energy $E_L$, the wear energy $E_V$, the wear energy $\Delta E_S$, the wear energy $\Delta E_B$, and a wear resistance R indicating a relationship between predetermined wear energy and a predetermined wear amount,
- wherein the state of the free rolling run is included in a state of taxiing indicating a state in which the aircraft runs on a ground under a power of the aircraft.

3. The remaining tire tread depth management system according to claim 2, wherein:
- wear energy $E_W$ of the aircraft tires generated during a predetermined period of time is calculated in accordance with the wear energy $E_P$, the wear energy $E_L$, the wear energy $E_V$, the wear energy $\Delta E_S$, and the wear energy $\Delta E_B$; and
- the wear amount wear of the aircraft tires is estimated such that the wear energy $E_W$ is divided by the wear resistance R.

4. The remaining tire tread depth management system according to claim 2, wherein the wear energy $E_P$, the wear energy $E_L$, the wear energy $E_V$, the wear energy $\Delta E_S$, and the wear energy $\Delta E_B$ are calculated in accordance with a position of each rib of the respective aircraft tires in a state in which the aircraft tires are mounted on the aircraft.

5. The remaining tire tread depth management system according to claim 4, wherein, when the position of each rib of the respective aircraft tires is represented by use of a variable i, the wear energy $E_P$ is calculated according to the following formula 1:

[Math. 1]

$$E_P^i(P) = a_P P^2 + b_P P + c_P \quad (1)$$

where P is the internal pressure, and $a_P$, $b_P$, and $c_P$ are constants, the wear energy $E_L$ is calculated according to the following formula 2:

[Math. 2]

$$E_L^i(L) = a_L L^2 + b_L L + c_L \quad (2)$$

where L is the load, and $a_L$, $b_L$, and $c_L$ are constants, the wear energy $E_V$ is calculated according to the following formula 3:

[Math. 3]

$$E_V^i(V) = a_V V^2 + b_V V + c_V \quad (3)$$

where V is the velocity, and $a_V$, $b_V$, and $c_V$ are constants, the wear energy $\Delta E_S$ is calculated according to the following formula 4:

[Math. 4]

$$\Delta E_S^i(SA) = a_S (SA)^2 + b_S (SA) + c_S - E_{FR} \quad (4)$$

where SA is the slip angle, and $a_S$, $b_S$, and $c_S$ are constants, the wear energy $\Delta E_B$ is calculated according to the following formula 5:

[Math. 5]

$$\Delta E_B^i(G_x^{BR}) = a_B (G_x^{BR})^2 + b_B (G_x^{BR}) + c_B - E_{FR} \quad (5)$$

where $G_x^{BR}$ is the braking force, and $a_B$, $b_B$, and $c_B$ are constants, the wear energy $E_W$ is calculated according to the following formula 6:

[Math. 6]

$$E_W^i = \sum E_P^i(P) \cdot E_L^i(L) \cdot E_V^i(V) \cdot \{E_{FR}^i + \Delta E_S^i(S) + \Delta E_B^i(B)\} \cdot \frac{V \Delta t}{2 \pi r} \quad (6)$$

where $\Delta t$ is a predetermined time, and r is a circling radius of the aircraft, and the wear amount $wear^i$ of the aircraft tires is estimated according to the following formula 7:

[Math. 7]

$$wear^i = \frac{E_W^i}{R} \quad (7)$$

where R is the wear resistance.

6. The remaining tire tread depth management system according to claim 2, wherein the internal pressure and the velocity are acquired from an airline.

7. The remaining tire tread depth management system according to claim 1, wherein the remaining tire tread depth measurement device includes:
- a measurement mechanism configured to measure a depth of each groove formed on a tread of the respective aircraft tires with no contact with the tread;
- a slide mechanism configured to cause the measurement mechanism to slide in a predetermined direction;
- an output unit configured to output the measurement data indicating the depth measured by the measurement mechanism; and
- a housing unit housing the measurement mechanism and the slide mechanism,
- wherein the housing unit has an inclined surface which is to face the tread,
- the inclined surface is provided with a measurement window, and
- the measurement unit is arranged inside the measurement window.

8. The remaining tire tread depth management system according to claim 7, wherein:
    the housing unit has a box-like shape having at least the inclined surface, a pair of side surfaces, and a back surface opposed to the inclined surface;
    the inclined surface and the back surface are longer than the paired side surfaces; and
    the measurement window extends in the predetermined direction.

9. The remaining tire tread depth management system according to claim 8, wherein the housing unit includes:
    a vertical surface extending in a vertical direction and connected to a lower edge of the inclined surface; and
    a top surface extending in a horizontal direction and connected to an upper edge of the inclined surface and an upper edge of the back surface.

10. The remaining tire tread depth management system according to claim 7, wherein:
    the remaining tire tread depth measurement device includes an identification information acquisition unit configured to acquire identification information about identifying the respective aircraft tires; and
    the output unit outputs the measurement data associated with the identification information.

\* \* \* \* \*